United States Patent [19]
Watkins et al.

[11] Patent Number: 5,103,234
[45] Date of Patent: Apr. 7, 1992

[54] ELECTRONIC ARTICLE SURVEILLANCE SYSTEM

[75] Inventors: Harry E. Watkins, Boca Raton; Brent F. Balch, Ft. Lauderdale; Jeffrey T. Oakes, Deerfield Beach; Richard L. Copeland; Hubert A. Patterson, both of Boca Raton; Mart Martinson, Deerfield Beach, all of Fla.

[73] Assignee: Sensormatic Electronics Corporation, Deerfield Beach, Fla.

[21] Appl. No.: 657,899

[22] Filed: Feb. 20, 1991

Related U.S. Application Data

[60] Continuation of Ser. No. 353,861, May 18, 1989, abandoned, which is a division of Ser. No. 91,052, Aug. 28, 1987, Pat. No. 4,859,991.

[51] Int. Cl.⁵ .................. H01Q 11/120; H01Q 7/000; H01Q 21/000; G08B 13/240
[52] U.S. Cl. ..................................... 343/742; 340/572; 343/867
[58] Field of Search .............. 343/741, 742, 743, 866, 343/867; 340/572

[56] References Cited

U.S. PATENT DOCUMENTS

| | | | |
|---|---|---|---|
| 3,478,361 | 11/1969 | Middlemark | 343/742 |
| 3,588,905 | 6/1971 | Dunlavy, Jr. | 343/867 |
| 4,016,553 | 4/1977 | Novikoff et al. | 340/280 |
| 4,074,249 | 2/1978 | Minasy | 340/280 |
| 4,118,693 | 10/1978 | Novikoff | 340/572 |
| 4,135,183 | 1/1979 | Heltemes | 340/572 |
| 4,309,697 | 1/1982 | Weaver | 340/572 |
| 4,433,336 | 2/1984 | Carr | 343/742 |
| 4,539,558 | 9/1985 | Fearon | 340/572 |
| 4,634,975 | 1/1987 | Eccleston et al. | 324/232 |
| 4,647,937 | 3/1987 | Hidaka et al. | 343/842 |
| 4,679,046 | 7/1987 | Curtis et al. | 343/867 |
| 4,751,516 | 6/1988 | Lichtblau | 343/742 |
| 4,769,631 | 9/1988 | Copeland | 340/551 |
| 4,795,995 | 1/1989 | Eccleston et al. | 340/572 |
| 4,845,509 | 7/1989 | Asbrink | 340/572 |

FOREIGN PATENT DOCUMENTS

| | | | |
|---|---|---|---|
| 0057505 | 4/1984 | Japan | 343/867 |
| 8200378 | 2/1982 | World Int. Prop. O. | 340/572 |

Primary Examiner—Michael C. Wimer
Assistant Examiner—Peter Toby Brown
Attorney, Agent, or Firm—Robin, Blecker, Daley & Driscoll

[57] ABSTRACT

A magnetic article surveillance system utilizing microcomputer control and unique time domain and frequency domain information gathering channels whose information is processed by the microcomputer via preselected time domain and frequency domain criteria.

8 Claims, 19 Drawing Sheets

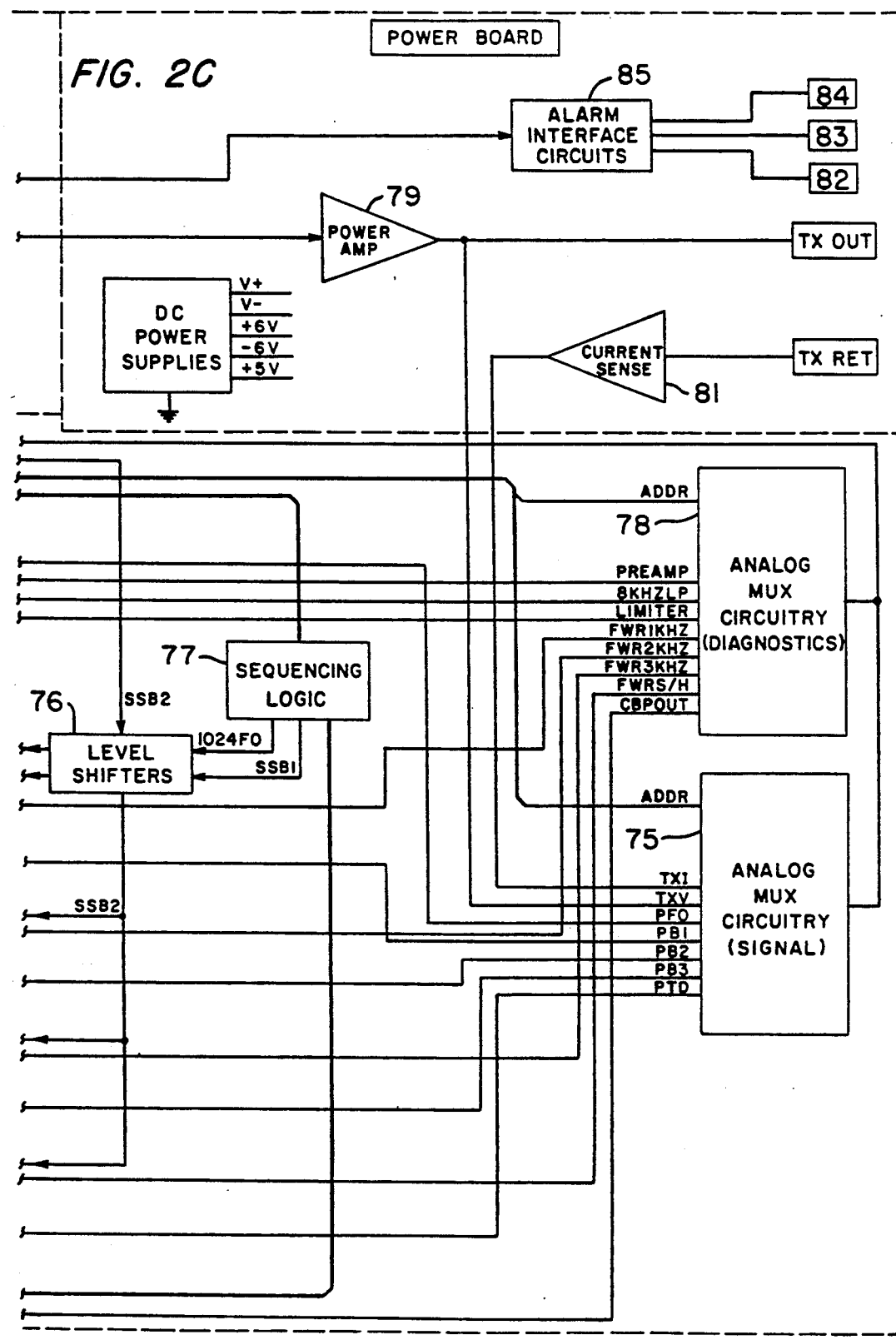

Programmable Functions

| Function | Choices |
|---|---|
| Transmit Frequency | 71.5, 72.4, 73.3, 74.2 Hz |
| Transmit Current | Low, Med, High (6.0, 6.5, 7.0 Ap-p) |
| Sensitivity | Low, Med, High |
| Audio Alarm | |
|     Pitch | 2400, 2700, 3291 Hz |
|     Volume | Off, Low, High |
|     Duration | 2, 5, 7, 10 Seconds |
|     Rep Rate | 3.0, 4.82, 6.0 Hz |
| Visual Alarm | |
|     Duration | Off, 2, 5, 10, 15, 20 Seconds |
|     Rep Rate | 3.0, 4.82, 6.0 Hz |
| Fundamental Inhibit | Off, 100, 80, 60, 40 mV |
| Fundamental Stored | Off, On |

*FIG. 4*

COMB BANDPASS FILTER (IMPLEMENTATION)

FIG. 9B

ELECTRONIC ARTICLE SURVEILLANCE SYSTEM

This is a continuation application under 37 CFR 1.62 of prior application Ser. No. 353,861, filed May 18, 1989, now abandoned, which is a division of application No. 091,052, filed Aug. 28, 1987, and now U.S. Pat. No. 4,859,991.

BACKGROUND OF THE INVENTION

This invention relates to electronic article surveillance systems and, in particular, to electronic article surveilance systems which utilize magnetic marker for surveillance purposes.

Eectronic article surveillance systems wherein magnet markers are attached to the articles under surveillance are well known in the art. In these systems, an alternating magnetic field is applied to an interrogation zone via an antenna system. If an article with a suitable magnetic marker then passes into the zone, the presence of the marker in the zone causes a perturbation in the field. The field in the zone is sensed by a receiver antenna, whose output contains this perturbation. A detector analyzes the signal from the receiver to assess whether a perturbation to the field has occurred and whether this perturbation is a result of a marker If so, an alarm is activated indicating passage of the marker through the zone.

In prior electronic article surveillance systems, the perturbations to the field created by a magnetic marker have been detected using frequency domain or time domain analysis techniques. Typically, when frequency domain techniques are employed, the frequency content of the received signal is investigated for harmonics of the fundamental (drive frequency) of the applied field These harmonics are generated as a result of the non-linear hysteresis characteristics of the magnetic marker. By comparing the relative amplitudes of the detected harmonics, an indication of the frequency spectrum of the signal is obtained. Using certain decision criteria this spectrum is then compared with the spectrum expected from a valid marker and a decision as to the presence of the marker is reached. The use of frequency domain analysis techniques is particularly desirable where noisy conditions may be expected, but the high Q filters required to isolate the generated harmonics make the system response time long.

In time domain analysis, the time domain pulse of the received signal is analyzed with respect to its pulse shape and its time displacement relative to the fundamental phase of the applied field. With this type of analysis, the shape of the signal is influenced significantly by the amplitude and group delay characteristics of the filtering used in the detection process and changes in the received signal due to variations in the applied drive field. Furthermore, because the analysis utilizes amplitude thresholds which must be set above the ambient noise level, the use of this procedure is most attractive where a high signal-to-noise ratio is present.

As can be appreciated, whether time domain or frequency domain analysis techniques are utilized in the surveillance system, it is essential that the detection process be able to discriminate between perturbations or changes in the field resulting from valid markers and those from non-marker sources. Failure of the system to provide the needed discrimination results in false alarms which significantly detract from the integrity and usefulness of the system.

The problem of reliably distinguishing between magnetic marker perturbations and extraneous non-marker perturbations is heightened in retail establishments particularly, supermarkets, where metallic fixtures, metal counters, metal shopping carts, noise generators (e.g., laser scanners, digital scales, credit card and bar code readers, conveyor belts, etc.) and the like proliferate. This equipment creates a harsh electronic environment and may cause perturbations in the detection system which either mask valid marker signals and/or appear as valid marker signals. The reliability of the system is, therefore, significantly compromised.

Present surveillance systems have been unable to completely solve this reliability problem and have suffered from other types of disadvantages. Thus, systems have been designed which are physically very large, causing flow through the interrogation zone to be impeded. Also, these systems have utilized relatively strong applied fields. As a result, the fields often extend beyond the interrogation zone, increasing the likelihood of perturbations from non-marker sources or from markers outside the interrogation zone. Furthermore, the overrange of these systems coupled with electronic noise significantly reduces system sensitivity. A relatively poor detection rate and an undesirable number of false alarms, thereby often result.

There has recently been developed a magnetic marker having attributes which can alleviate some of the aforementioned problems encountered in these prior systems. U.S. Pat. No. 4,660,025, entitled "Article Surveillance Magnetic Marker Having An Hysteresis Loop With Large Barkhausen Discontinuities", assigned to the same assignee hereof, discloses a magnetic marker of this type. The marker comprises a magnetic material having retained stress and a magnetic hysteresis loop which exhibits large Barkhausen discontinuities. As a result, when the marker is exposed to an applied magnetic field above a threshold value, the marker undergoes a regenerative reversal in its magnetic polarization.

Because this regenerative reversal can be made to occur at a relatively low threshold value, the applied field required for the marker can advantageously also be relatively low. Furthermore, the step function reversal exhibited by the magnetic polarization of the marker results in perturbations of the field which are rich in high harmonics, making detection easier and simpler.

The marker of the '025 patent is also advantageous in that it can be deactivated by a variety of practices as is disclosed in U.S. Pat. No. 4,686,516, entitled "Method, System and Appraratus for Article Surveillance", and also assigned to the same assignee hereof. Thus by alleviating the retained stress in the marker or by crystallizing a portion of the marker, the marker is easily deactivated so as to be able to pass through the interrogation zone without producing any alarm.

Another advance which is directed to overcoming the aforementioned problems of prior systems is disclosed in co-pending U.S. patent application Ser. No. 880,138 now U.S. Pat. No. 4,769,631 also assigned to the same assignee hereof and whose disclosure is incorporated herein by reference. The '138 application discloses a magnetic shield which is to be placed at the side edges of the interrogation zone and which is adapted to reduce the intensity of the magnetic field outside the zone. The shield is also adapted such that the perturbations to the field caused by the shield itself can be easily distinguished and blocked.

As disclosed in the '138 application, to achieve these characteristics, the magnetic material of the shield must have a sufficiently high resistivity, for a given permeability and frequency of the applied magnetic field, to provide a skin depth substantially in excess of the thickness of the shield. The magnetic material must also have a saturation flux density greater than the maximum flux density produced in the shield due to the positive and negative peak excursions of the applied field. Finally, the magnetic material must be such that it responds to the applied field at the peaks of the field with little or no response near the zero crossings.

As further discussed in the '138 application, shields made from ferrites and pressed powdered iron can provide the aforesaid characteristics and result in a ratio of peak front field (i.e., field inside the zone) to peak back field (i.e., field behind the shield) of at least ten to one. A particular ferrite which exhibits this 10 to 1 ratio and, in addition, a maximum response at the applied field peaks and a minimum response at the zero crossings is a ferrite identified commercially as Q5B, manufactured by TDK Corporation of Tokyo, Japan. Similar characteristics are found in pressed powdered iron, preferably unsintered, having about 99 percent iron content with about one percent trace elements including FeP, $H_2$, C, Mn, S and perhaps other minute amounts of other elements.

Where the magnetic shield is a laminate of a plurality of thin sheets glued together and electrically isolated from one another, the skin depth of each such sheet is made substantially greater than the sheet thickness.

The need for minimum response of the shield near the zero crossings of the applied field is due to the fact that magnetic markers and, in particular, the markers of the '025 patent, have a maximum response at the zero crossings of the applied field and a minimum response at the field peaks. By selecting the shield magnetic material to have the reverse characteristic, perturbations caused by the shield can be easily detected and eliminated without interfering with detection of the marker perturbations.

The '138 patent application also teaches, in conjunction with the above discussed magnetic shield, an auxiliary shield of electrically conductive material. This shield is situated behind the magnetic shield and attenuates, through eddy current losses, perturbations from markers and external noise sources located outside the interrogation zone.

While the above magnetic marker and magnetic shield provide significant improvements to prior magnetic electronic article surveillance systems, there still exists a need for an overall system having attributes of substantial reliability, compactness and freedom from false alarms.

It is therefore a primary object of the present invention to provide an improved electronic article surveillance system and method.

It is a further object of the present invention to provide an improved magnetic electronic article surveillance system and method having enhanced control functions.

It is a further object of the present invention to provide an improved magnetic article surveillance system and method having enhanced detection practices.

It is yet a further object of the present invention to provide an improved magnetic electronic surveillance system and method having unique frequency domain and unique time domain detection practices.

It is still a further object of the present invention to provide an improved magnetic electronic article surveillance system and method which is responsive and self adjusting to changes in the surrounding environment including changes in noise.

It is a further object of the present invention to provide an improved magnetic electronic surveillance system having an antenna system with enhanced properties.

It is yet a further object of the present invention to provide an improved magnetic electronic surveillance system having an antenna pedestal with improved properties.

It is yet a further object of the present invention to provide an improved magnetic electronic surveillance system having unique comb bandpass filter means.

It is yet a further object of the present invention to provide an improved magnetic electronic surveillance system having a unique comb notch filter means.

It is a further object of the present invention to provide an improved magnetic electronic surveillance system as above described with the further addition of a magnetic marker as in the '025 patent and a shield as in the '138 application.

SUMMARY OF THE INVENTION

In accordance with the principles of the present invention the above and other objectives are realized in a magnetic electronic article surveillance system wherein system operation is under microcomputer control. Detector circuitry including frequency and time domain circuits process the received signal from the interrogation zone. Filter means including an unique comb bandpass filter confines the received signal in the detector circuitry to harmonics of the applied field.

At least two bands of frequencies of the received signal are isolated by the frequency detection circuitry and the signal content in each band determined. At the same time, the time domain circuitry samples the receive signal to produce a digitized signal. The results of these operations are then processed by unique decision routines in the microcomputer. These routines look to improved valid marker criteria and have thresholds related to ambient noise and undesired responses from objects other than valid markers.

Decision information from the time and frequency domain routines in the microcomputer is generated for each half cycle of the applied field. This information is used to update respective time domain and frequency domain counters. Signals for initiating alarm activation are generated upon the counters reaching preselected counts.

Another routine in the microcomputer processes selected values of successive digitized signals in accordance with thresholds based upon the expected characteristics of unwanted high value spurious perturbations (i.e., electronic noise spikes). A further routine in the microcomputer looks to changes in the fundamental frequency component which is also isolated by the detection circuitry. The outputs of both these routines are used to preempt alarm activation by the time and frequency domain counters.

Noise levels are monitored by the microcomputer upon system initiation and periodically updated, as is the level of the fundamental frequency component. The computer routines are thus updated with these values so that system is able to dynamically change with changes in the environment.

The comb filter means of the system utilizes an integrated circuit delay line provided with feedback to achieve desired comb response. This enables filtering with high Q values, while eliminating the need and bulk associated with the discrete capacitors of conventional filters.

The system also incorporates receiver and transmitter antenna arrays which are designed to reduce unwanted nulls normally present in the applied field. The receiver antenna array comprises first and second upper loops arranged in nested relationship and third and fourth lower loops also arranged in nested relationship, the first and second loops forming with the respective third and fourth loops figure eight configurations. The loops are connected electrically in series and phased so that the upper loops have the same first phase and the lower loops the same second phase opposite the first phase. In preferred configuration the portion of each loop along the junction in the figure eight configuration is at an angle or slant relative to the horizontal.

The transmitter antenna array also comprises a nested arrangement of loops. In this arrangement, the current in the inner loop is in the same direction as that in the outer loop, while the axes of the inner loop is rotated relative to the axes of the outer loop by a preselected amount, preferably, forty five degrees.

The aforesaid antenna arrays of the system are supported in pedestals which are adapted to immobilize the arrays and to have substantial physical integrity. This is accomplished by a process of filling the region between the walls of the pedestals with foam and placing the unit under pressure as the foam cures. The resultant rigid foam encapsulates the antennas rendering them immobile, while it substantially fills the void space between the pedestal walls providing desired strength and stiffness to the pedestal.

It is further contemplated in accordance with the invention that the system of the invention utilize a marker as disclosed in the '025 patent and incorporate with the antenna arrays in the pedestal a shield as disclosed in the '138 application. In such case, the system is further adapted to inhibit the aforementioned shield spike pulse from influencing system operation.

BRIEF DESCRIPTION OF THE DRAWINGS

The above and other features and aspects of the present invention will become more apparent upon reading the following detailed description in conjunction with the accompanying drawings, in which:

FIG. 2A-2C show in more detail the block diagram of the system of FIG. 1;

FIG. 4 shows various system parameters for the system of FIG. 2A-2C and representative values for these parameters;

FIGS. 9, 9A and 9B show the comb notch filter of the detection portion of the system of FIGS. 2A-2C;

DETAILED DESCRIPTION

Figure 1:
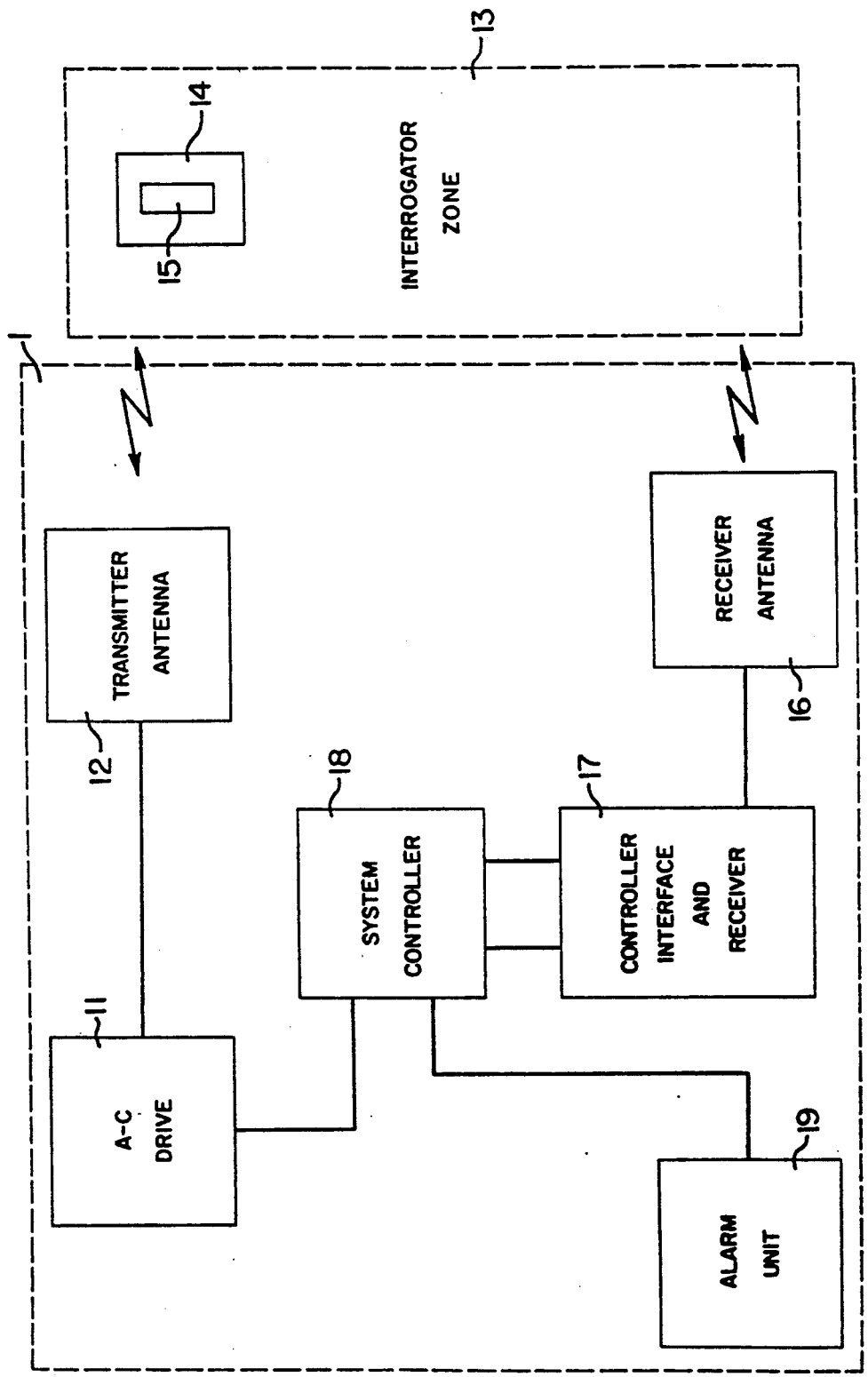
FIG. 1 shows a simplified block diagram of a magnetic electronic surveillance system in accordance with the principles of, the present invention.

In FIG. 1, a magnetic electronic surveillance system 1 is illustrated. As shown, the system 1 includes an AC drive 11 which supplies a high polarity sine wave AC current and voltage at a fundamental frequency Fo to a transmitter antenna 12. The antenna 12, in turn, develops an alternating magnetic field at the frequency Fo which propagates into an interrogation zone 13 through which articles under surveillance, such as article 14, must pass.

The article 14 has affixed to it a marker 15 comprised of a magnetic material. The marker 15 thus creates perturbations in the magnetic field which contain harmonics of the fundamental frequency Fo and are coupled or sensed by a receiver antenna 16. The receiver antenna 16 converts the perturbations into an electrical signal which is applied to a controller interface and receiver 17. The receiver 17 develops frequency domain and time domain information from the received signal and through its interface makes this information available to the system controller 18.

The controller 18 analyzes this information in accordance with certain decision criteria. If the decision criteria indicate the presence of a valid marker, the controller addresses an alarm unit 19. The alarm unit 19, in turn, activates providing an indication that an article 14 is in the interrogation zone.

The system controller 18 provides control for the AC drive 11 and receives transmitter AC current status and voltage information. Also, the controller 18 supplies timing, address and other information to the controller interface and receiver 17 as will be described more fully below.

In the preferred form of the system 1, the marker 15 is of the type disclosed in the '025 patent and thus has a hysteresis loop which exhibits a large Barkhausen discontinuity or step function change in flux each time the applied field reverses polarity and exceeds a relatively low threshold value. The perturbation to the field caused by the marker 15 will thus be in the vicinity of the zero crossings of the applied field and will be rich in harmonics of the fundamental frequency Fo. Furthermore, the expected marker signal will be a pulse of extremely narrow width (under 200μsec).

Also, in the preferred form of the system 1, the antenna arrays 12 and 16 are provided with shielding as discussed above, which results in so-called "shield spikes" in the received signal which the system 1 must account for and suppress.

While the preferred form of the invention thus utilizes the '025 marker and the shield of the '138 application, the principles of the invention have application to other marker and antenna array types. In such case, the system configuration and decision routines would be modified to account for the particular characteristics of the particular marker and/or antenna being, used.

Figure 2A:
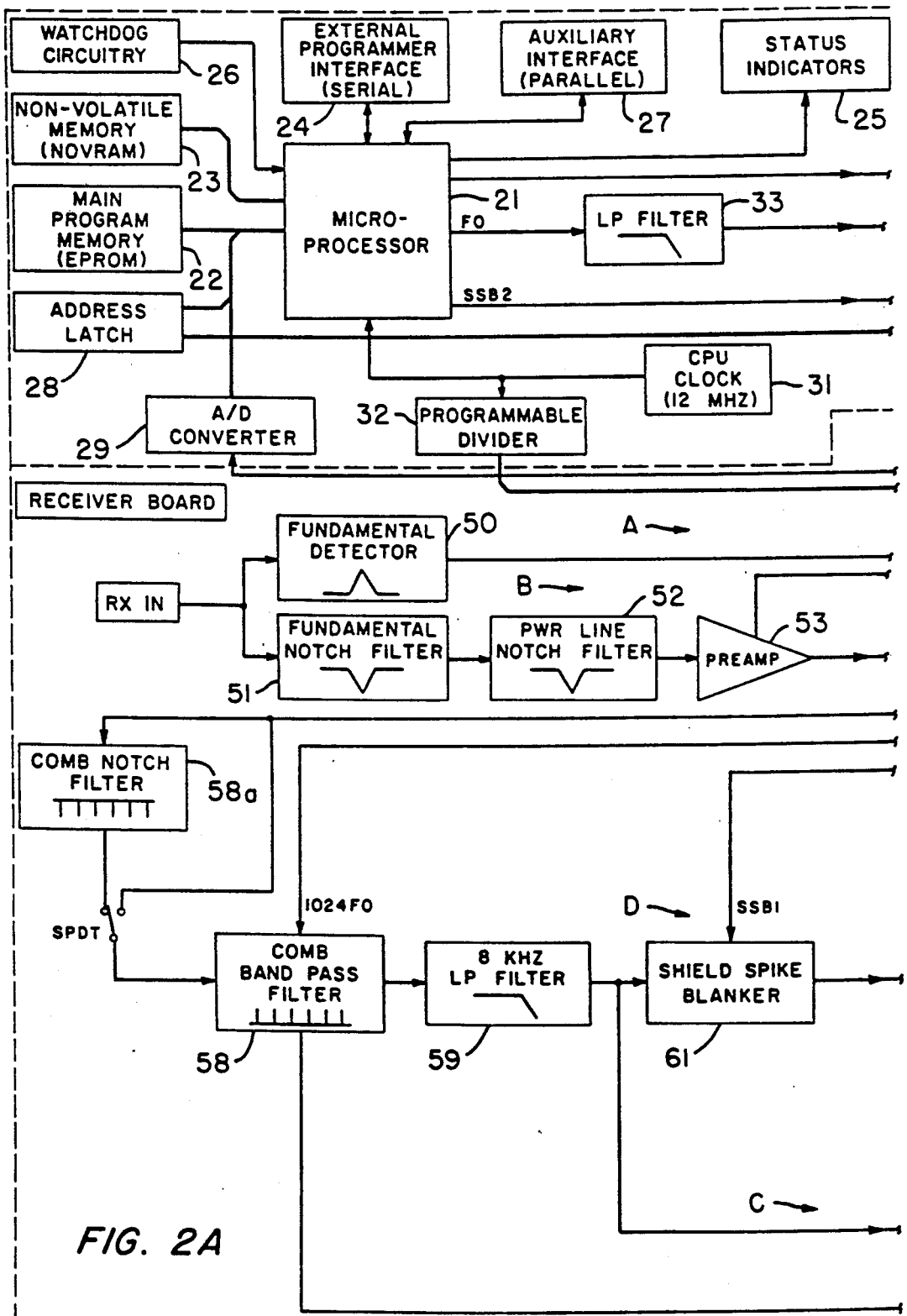
Figure 2B:
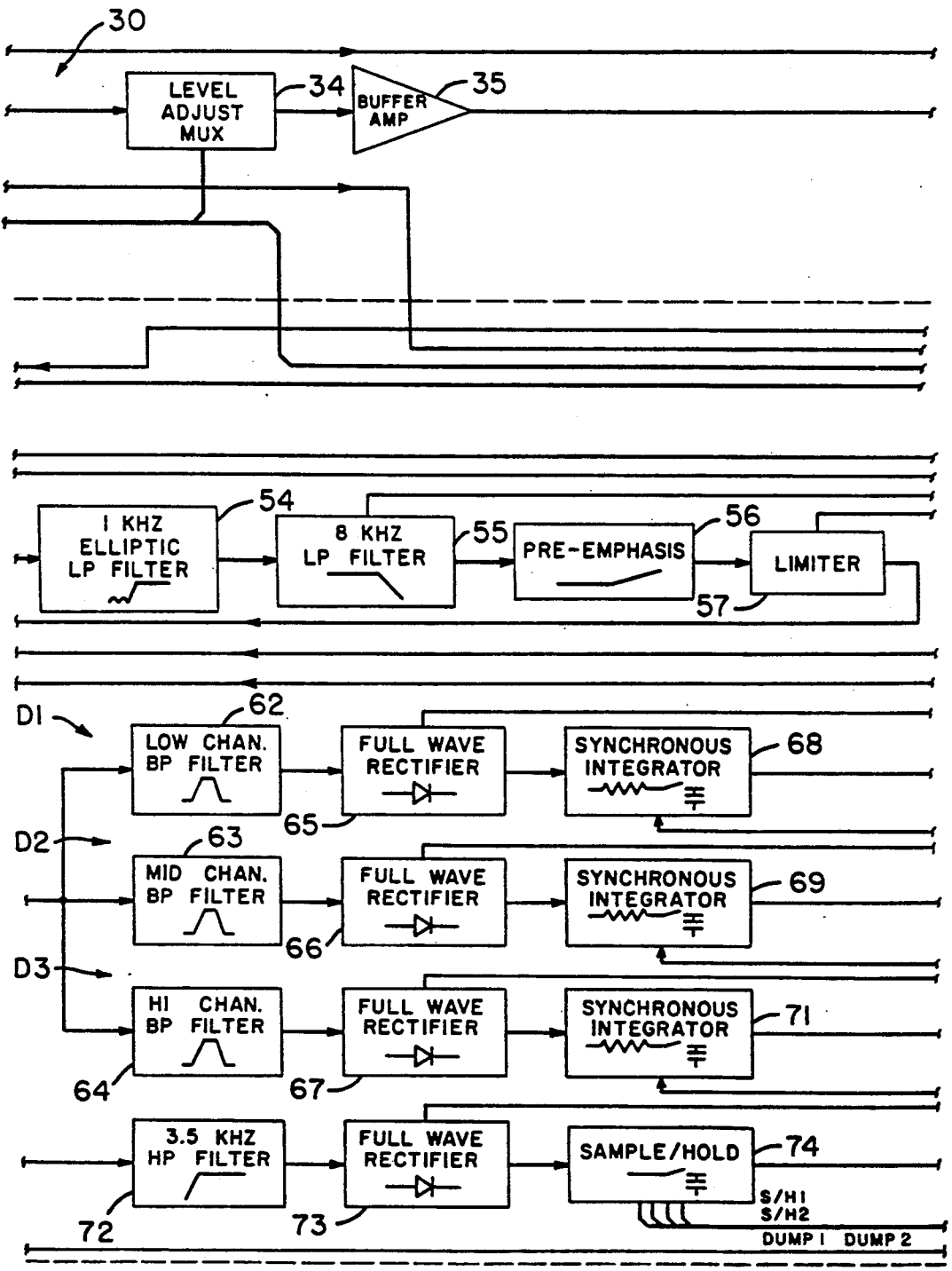

FIGS. 2A-2C illustrate in greater detail the system controller 18 and the controller interface and receiver 17 of FIG. 1. The controller 18 comprises a microcomputer 21 which typically might be an 8031 microcomputer manufactured by Intel and which effects primary sequential control over the system operation. The computer 21 communicates with a main program memory EPROM 22 which contains the main programs and the decision routines for the computer. A second non-volatile memory NOVRAM 23 is also provided for storage of operating parameters of the system. The NOVRAM 23 retains these parameters in the event of loss of power to the system.

A programming interface 24 provides means for externally communicating with the microcomputer 21. The interface 24 allows the operating parameters in the NOVRAM 23 to be set to accommodate the particular on-site conditions in which the system is being used. The interface 24 also allows a variety of diagnostics to be carried out to check system operation.

The microcomputer 21 provides system status signals to a status indicator 25. The watchdog circuitry 26 provides the computer 21 with a reset pulse upon power up which tells the computer to begin execution of the main program. An auxilliary interface 27 is also provided.

An address latch 28 permits the computer 21 to address other components in the controller 18 as well as the receiver 17. Analog data from the receiver 17 is converted to digital data for processing by the microcomputer 21 through analog-to-digital converter 29. A 12 MHz main CPU clock 31 provides the primary clock signal for the system.

The CPU clock 31 feeds the computer 21 and a programmable divider 32. The latter develops a plurality of further clock signals synchronized to the main clock for application to the microcomputer and other components of the system.

The controller 18 also includes a drive channel 30 for establishing the drive current for the transmitter 12. The channel 30 includes low pass filter 33, level adjuster 34 and buffer amplifier 35.

FIGS. 2A-2C also shows a power amplifier 79 of the AC drive 11 and a current sensor 81 associated with the transmitter antenna 12. Audio alarm 82, visual alarm 83, event counter 84 and alarm interface circuit 85 of alarm unit 19 are likewise shown.

As discussed above, program interface 24 is used to address the microcomputer 21 in order to set in the NOVRAM 23 the particular operating parameters desired of the system. These parameters will, in most cases, be dependant on the environment in which the system 1 is to be used. FIG. 4 shows representative parameters programmable into the NOVRAM 23 and illustrative values for these parameters.

The NOVRAM 23 is also provided with an initial set of parameter values, so-called default values, which are preset for a nominal environment. These parameters can be used to govern system operation, in the event the environmental conditions are nominal.

Once the system parameters are set, the microcomputer 21 proceeds to set the transmitter antenna current through the drive channel 30. For this purpose, a pulse signal at the desired drive frequency Fo is generated by the microcomputer 21. This pulse signal is developed from a further pulse signal SSB1 which is at twice the desired frequency (2Fo) and which is developed by programmable divider 32 from the 12 MHz clock signal.

The pulse signal at frequency Fo is passed by the microcomputer 21 through low pass filter 33 and converted into an AC sine wave signal. The resultant AC signal passes through the level adjuster 34 which has been addressed by the microcomputer to set an initial current level and is passed through buffer amplifier 35 to the power amplifier 79 of the transmitter AC drive 11. The output of the amplifier 79 drives the transmitter antenna 12 at the frequency Fo and a magnetic field at this frequency is established in the interrogation zone 13.

Current sensor 81 senses the current in the transmitter antenna coils and delivers its output to port TXI of an analog multiplexer 75 in the receiver circuit 17. This port is addressed by the microcomputer 21 through address latch 28 and address port ADDR of multiplexer 78 and the transmitter current is read via analog-to-digital converter 29.

The microcomputer 21 then compares this current value to the preset current value stored in NOVRAM 23 and if there is a difference addresses the level adjuster 24 through address latch 28 to cause the current to change toward the preset value. This process continues until the current level is set to the preset level.

Figure 3:
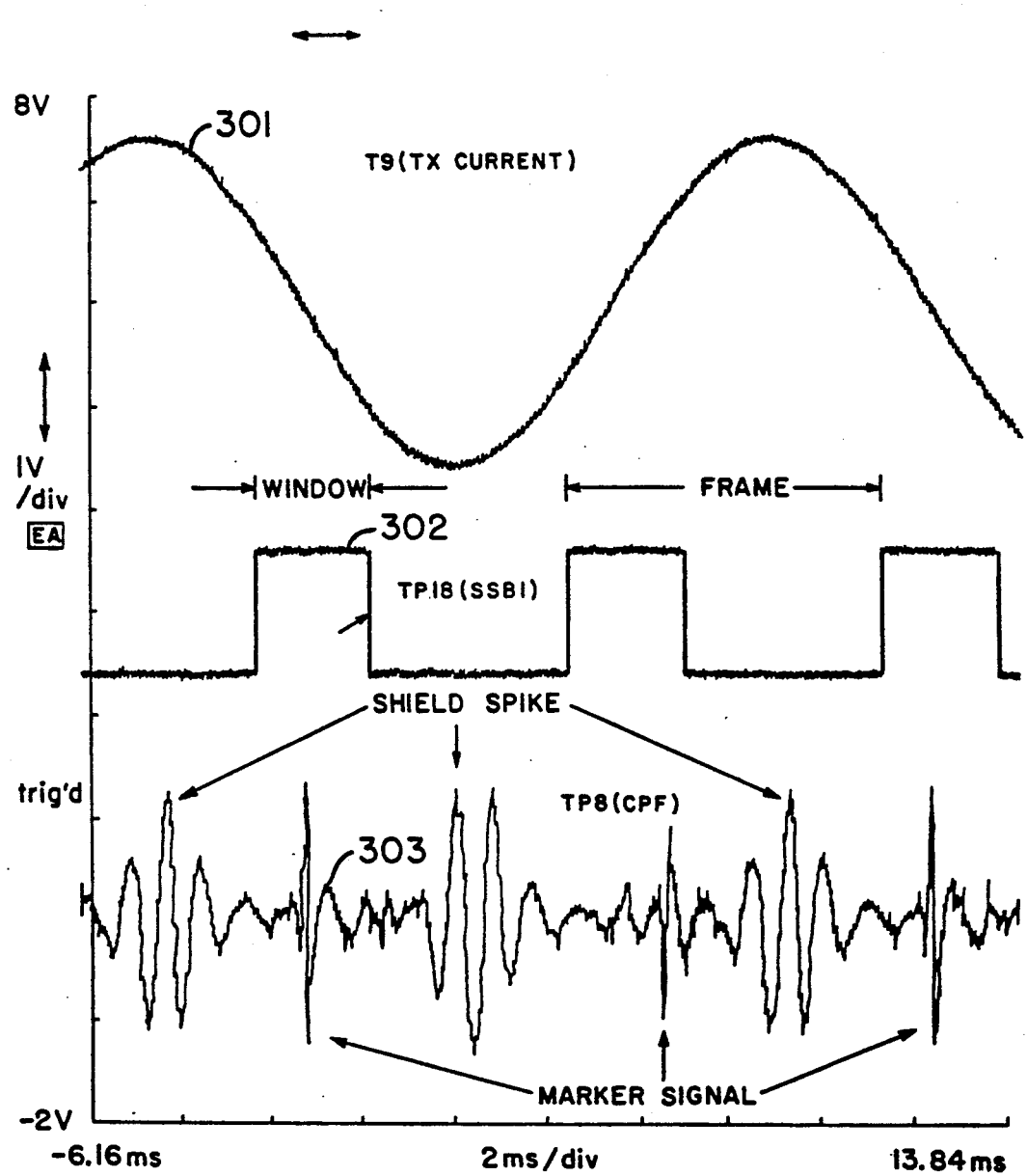
FIG. 3 shows waveform diagrams for various signals in the system of FIG. 2A-2C.

Once the current level is set, the computer 21 adjusts the phase of the drive current via the Fo signal. This adjustment is such that the peaks of the drive current are at the zero level intervals of the SSB1 signal and the zero crossings are at the logic one level intervals of the SSB1 signal. This relationship is illustrated by the waveforms 301 and 302 of FIG. 3 and, as can be appreciated, allows the signal SSB1 to provide signal blanking during peak amplitudes of the transmitter current and signal passage near the zero crossing intervals. The signal SSB1 can, therefore, be used to blank the shield spike (shown in waveform 303 in FIG. 3) which develops in the system as a result of use of the shield disclosed in '138 application. This will be discussed further below.

As shown in FIG. 2A-2C, the system 1 is also further adapted to ensure that the transmit antenna array is operating at resonance. Thus, the multiplexer 75 of the system, in addition to receiving transmitter current information from current sensor 81 at port TXI also receives at port TXV transmitter voltage data from the output of the antenna power amplifier 79. The microcomputer 21, at initialization, reads and stores the transmitter current and voltage information at multiplexer ports TXI and TXV.

The microcomputer also compares the phases of these signals to see whether a phase difference exists. If the phases differ, the microcomputer recognizes a non-resonance condition of the transmitter antenna 12 and adjusts the transmit frequency to bring the transmit current into phase with the transmit voltage so that the transmit antenna operates at resonance.

Having set the phase and level of the transmit current, the microcomputer 21 then addresses, via address latch 28 and address port ADDR, the ports PFo, PFB1, PFB2 and PFB3 of the multiplexer 75. At these respective ports, the receiver 17 provides the fundamental component level of the received signal and the the received signal energy levels in three preselected frequency bands FB1, FB2 and FB3. The microcomputer 21 treats the levels in the latter three bands as ambient noise levels. Averages of these levels and the fundamental level are stored by the microcomputer for future use in the system operation.

The computer now begins its surveillance operation. This operation is conducted repetitively by the computer every half cycle of the transmit current, which half-cycle is referred to as a "frame". During a first interval or this half cycle, referred to as the "marker window" interval the microcomputer causes the receiver 17 to gather frequency and time domain information from the received signal which contains any perturbations occurring to the field in the interrogation zone. The microcomputer reads this information from the receiver 17 and during the remaining interval of the frame (the "processing interval"), via its decision routines, evaluates whether the information is indicative of a valid marker in the zone.

In the receiver 17, the received signal is branched through a first channel A comprised of fundamental detector 50. The detector 50 extracts, via a bandpass filter, the fundamental frequency component (i.e., the component at Fo) of the signal. This level is then made available to the multiplexer 75 at the port PFo for subsequent analysis by the microcomputer.

The received signal is also branched through a second channel B wherein the notch filters 51 and 52 remove, respectively, the frequency component of the signal at Fo and at the frequency of the power line to the system (i.e., frequencies in a range of 50-60 Hz). Extraction of these frequency components removes signal content which might otherwise result in false marker indications.

The resultant signal from filter 52 is then amplified in preamplier 53 and the amplified signal passed in sequence through high pass and low pass filters 54 and 55. These filters effectively isolate the frequency band where harmonics of interest are expected for the markers used with the system. The particular frequency range indicated in FIGS. 2A-2C is for the preferred marker of the system (the '025 patent marker) which is capable of providing substantial harmonic content over the indicated range of 1-8 KHz. By limiting the frequency band of the signal to this relatively high range, the effects of non-marker disturbances and noise on the detection process are minimized.

After filtering, the signal is then passed through a pre-emphasis circuit 56 which is utilized to compensate for the rolloff of the signal caused by subsequent passage through comb bandpass filter 58. From circuit 56, the signal amplitude is limited in limiter 57 and then conveyed to the latter comb bandpass filter 58 which, as will be discussed below, comprises a digital delay line which is clocked at a multiple (1024) of the fundamental frequency Fo.

The filter 58 has narrow passbands at the fundamental Fo and its harmonics and thus passes only harmonics of Fo. The filter therefore further confines the signal to only those frequency components expected to result from the system marker. The design of the filter 58 also adds to the compactness of the system, since it does not employ discrete bulky capacitors.

After passage through filter 58, sampling noise caused by the comb bandpass filter is removed by low pass filter 59. The resultant signal from the filter 59 is now sufficiently frequency and amplitude conditioned for passage through the time domain and frequency domain channels C and D of the receiver.

In the frequency domain channel D, the signal is first passed through shield spike blanker 61 which is controlled by the signal SSB1 so as to suppress the signal content during the zero or blanking interval of the signal SSB1 and pass the signal during the non-blanking interval of the signal. As discussed above, this blanking occurs at the peak values of the transmit current which is where the shield spike from the antenna shield occurs. Blanking is necessary because the shield spike is frequency coherent and cannot be filtered out. These spikes are thus removed from the signal by the blanker 61.

After blanking, the resultant signal is branched through a plurality of frequency domain sub-channels. Each of these sub-channels isolates a particular frequency band of the signal and determines the energy in this band. These energies are then used by the microcomputer in its frequency domain decision routine in evaluating for marker presence.

The number of frequency domain sub-channels is selected so as to ensure that at least two frequency bands are obtained which are reasonably certain to have frequency content expected from a marker. In the preferred form of the invention, three sub-channels D1, D2, D3, corresponding to low, mid, and high frequency bands FB1, FB2, and FB3 are utilized.

More particularly, the frequency bands FB1, FB2, and FB3 are isolated by respective low, mid and high range bandpass filters 62, 63, and 64, and full wave rectified in respective circuits 65, 66, and 67. Sychronous integrators 68, 69, and 71 then integrate the rectified signals, thereby developing DC values representative of the energy in each of the bands FB1, FB2, and FB3. These DC values appear at the respective ports PFB1, PFB2, and PFB3 of multiplexer 75 for subsequent processing by microcomputer 21.

The operation of the integrators 68, 69, and 71 is synchronized with the microcomputer operation by a second synchronizing signal SSB2 which is directed to the integrators via level shifter 76. The signal SSB2 is at the same frequency (2Fo) as the signal SSB1, but is slightly shifted in phase to account for the signal delay introduced by the filters 62-64. It should be noted also that the gains of the filters 62-64 are selected so that they normalize the outputs of the integrators 68, 69, and 71 based upon a preselected characteristic representative of a response expected from system markers. Thus with a marker in the zone 13, the outputs of integrators 68, 69, and 71 will be equal or ascending levels.

For the frequency band of interest in the present illustrative case, the bands FB1, FB2, and FB3 are centered about frequencies 1.5, 2.5, and 3.5 KHz. Furthermore, the bandwidth of each band is 600 Hz.

Turning now to the time domain channel C, this channel also receives the output from low pass filter 59 and passes it through a high pass filter 72. The lower cutoff of high pass filter 72 is selected so as to pass sufficient high harmonics of the signal to be able to obtain a good picture of the expected changes in a marker pulse. By placing the cutoff at the approximate center of the high bandpass sub-channel D3 (at 3.5 KHz for the above example), sufficient signal content is reasonably assured.

The signal from filter 72 is rectified in full wave rectifier 73 and sampled in sample and hold circuit 74 to obtain a digitized version of the signal. This digitized signal is made available to the microcomputer 21 through a further port PTD of multiplexer 75.

The sampling interval and the timing of the sample and hold circuit 74 are controlled by the microcomputer 21 through the sequencing logic 77. During each sampling interval the sample and hold circuit samples the signal and retains the previous sample. The microcomputer controls this circuit so that as the circuit aquires a new sample, the microcomputer reads and stores the previous sample contained in the holding circuit.

At the end of the marker window interval, the microcomputer 21 has thus stored in its memory a digitized form of the filtered and rectified received signal. At this time, the microcomputer accesses the lines PFB1, PFB2, and PFB3 of the multiplexer 75 and reads and stores the DC levels for the frequency bands FB1, FB2, and FB3.

The microcomputer then initiates its processing phase wherein it analyzes this time and frequency domain information via its decision routines. Based upon the results of these routines the microcomputer updates time domain and frequency domain counters 21a and 21b (see FIG. 15) and checks the count in each counter. Only when the counters are both at preselected counts indicative of marker presence over a number of frames does the microcomputer reach a decision that a marker is present. This decision results in the microcomputer 21 activating the alarms 82 and 83 via the alarm interface 85, unless the alarm decision is preempted as a result of further spike detection and fundamental evaluation routines described herein.

Figure 5A:
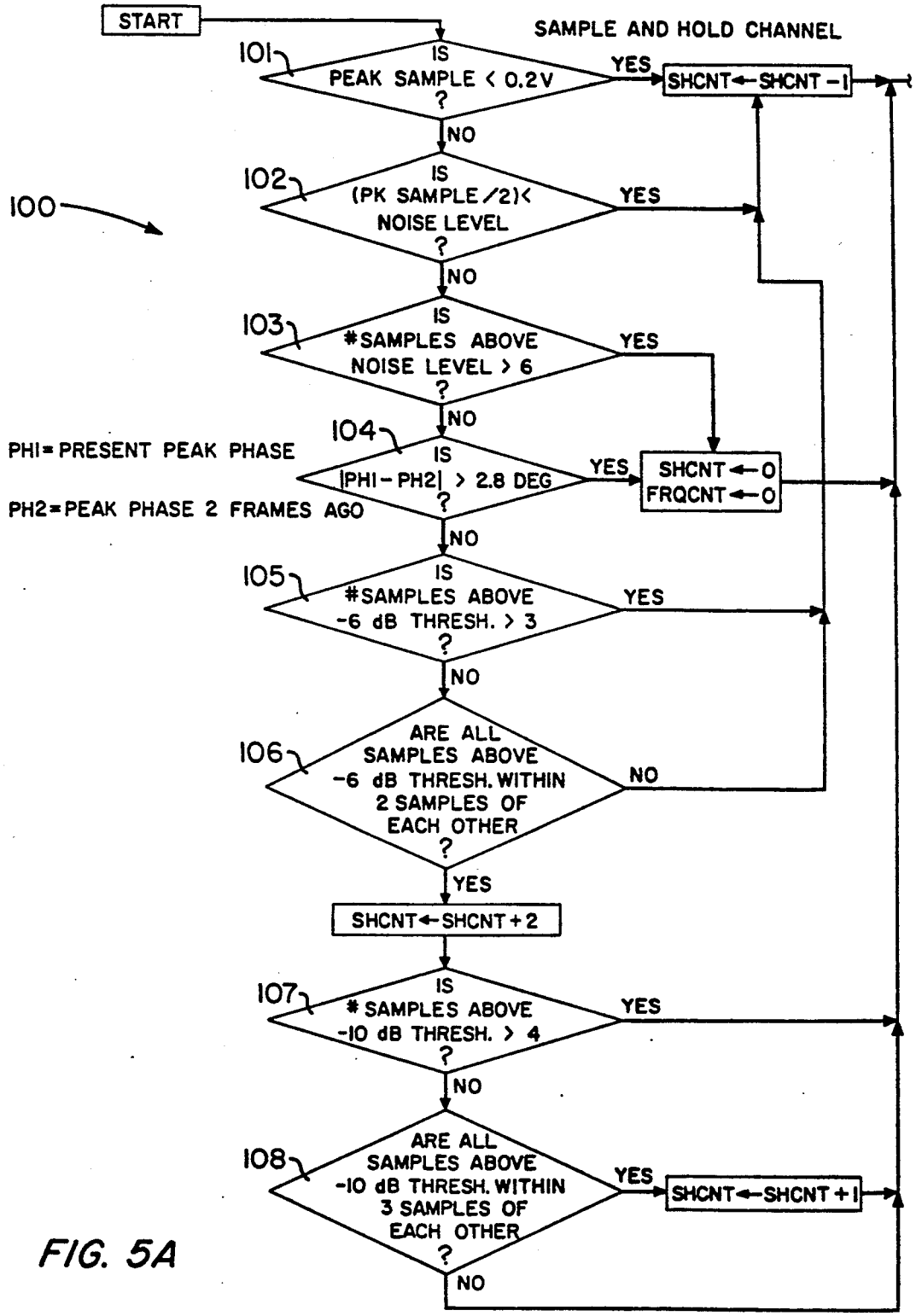
FIG. 5A-5B illustrate the routines of the microcomputer of the system of FIG. 2A-2C for time domain and frequency domain signal analysis.
Figure 5B:
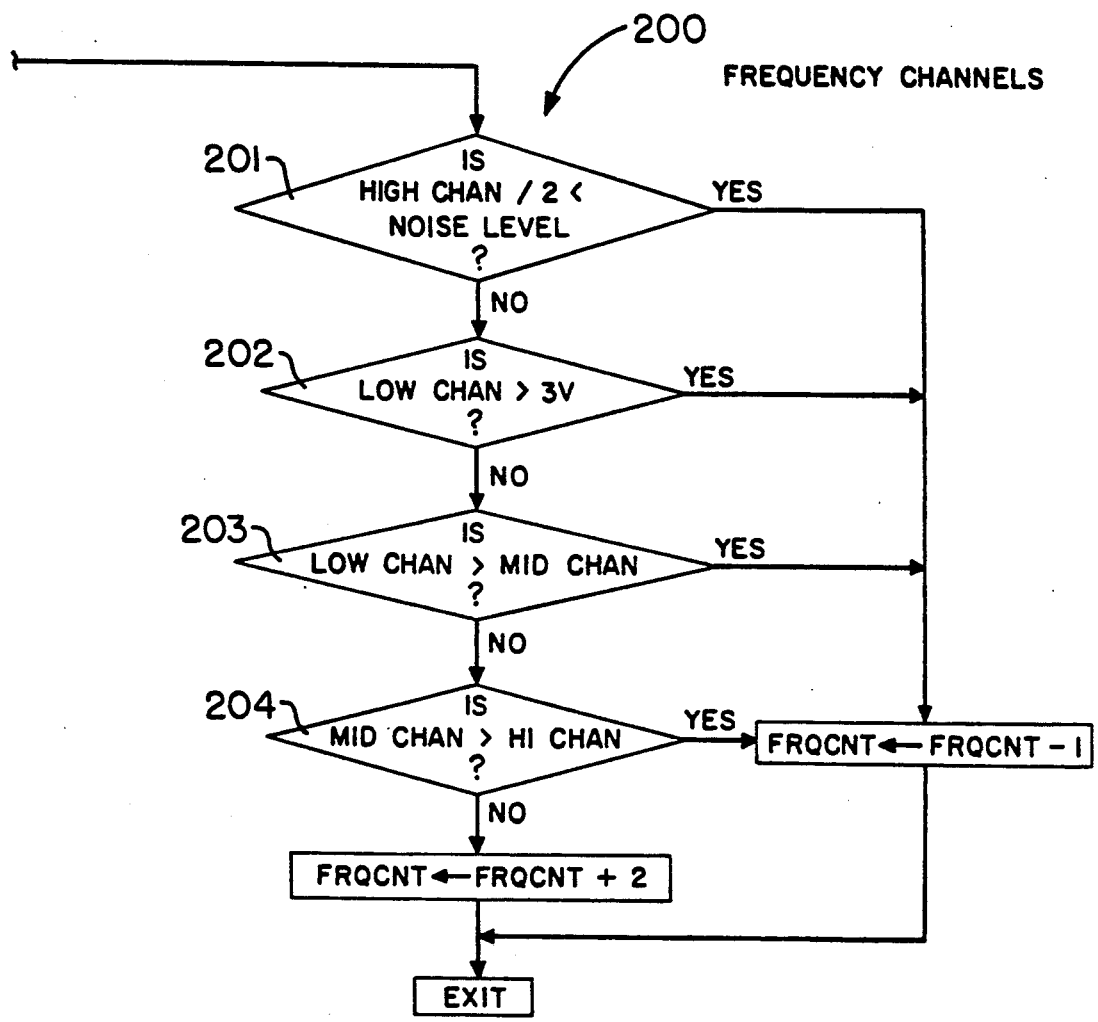

FIGS. 5A and 5B show flow diagrams of illustrative time domain and frequency domain routines 100 and 200 of the computer 21. These routines are based upon experimental frequency and time domain data of nonmarker objects, such as shopping carts, and similar data for markers of the '025 type. They are also based upon experimental data as to noise levels and minimum detectable signal levels. Finally, they assume that a frame contains 64 equal intervals and that the marker window contains 24 intervals each of which has associated with it one sample of the stored digitized signal.

The time domain routine is initiated first and when completed the frequency domain routine proceeds. In the present preferred case both routines are always carried out for each frame of operation.

In steps 101 and 102, the time domain routine 100 determines the peak sample value Ps of the 24 samples of the digitized signal in the marker window interval. By examining the signal in this interval only, any content due to antenna shielding is eliminated and the computer effectively blanks shield spikes.

In step 101 the peak sample Ps is compared to a 0.2V threshold and if less than this threshold the routine ends, the time domain counter 21a is decremented and the frequency domain routine started. If the peak sample is above the 0.2V threshold, the step 102 is instituted and the level at half the peak sample (the 6dB threshold) is compared to the ambient noise level previously determined and stored by the microcomputer. If the 6dB threshold is less than the noise level, the routine ends, the time domain counter 21a is decremented and the frequency domain routine instituted.

If the 6dB threshold is greater than the noise level, step 103 is initiated and a determination is made as to whether more than 6 samples of the 24 samples in the marker window interval are above the noise level. If more than six samples are above the noise level, the routine ends, both the time domain and frequency domain counters are set to zero, and the frequency domain routine is started. If not, then step 104 begins.

In step 104, the position in the frame of the peak sample Ps is compared to the position in the frame of the peak sample two frames previously. These positions are referenced to phase positions PH1 and PH2 of the samples in their respective frames and if these phases are different by more than 2.8 degrees (i.e., one sample interval), the routine ends, both the time domain and frequency domain counters are returned to zero and the frequency domain routine begins.

If the difference between these phases is less than 2.8 degrees, the step 105 is instituted and a determination is made as to whether the number of samples, above the 6dB threshold is greater than 3. If yes, the routine ends the time domain counter is decremented by 1 and the frequency domain routine is started. If no, the routine proceeds to step 106.

In step 106, all the samples above the 6dB threshold are compared to see whether they are within 2 sample intervals of each other. If no, the routine ends, the time domain counter is decremented by 1 and the frequency domain routine started. If yes, the time domain counter is incremented by 2 and the step 107 instituted.

In step 107, it is determined whether the number of samples above the 10dB threshold (i.e., ½ the peak sample value Ps) is greater than 4. If yes, the routine ends, and the frequency domain routine instituted. If no, the routine proceeds to step 108.

In this step, it is determined whether all the samples above the 10dB threshold are within 3 samples of each other. If yes, the time domain counter is incremented by 1, the routine ends and the frequency domain routine instituted. If no, the routine ends and the frequency domain routine instituted.

In summary, the time domain routine 100 examines the digitized signal samples to first determine whether the signal level is within the acceptable accuracy levels of the receiver equipment (step 101) and then within an acceptable signal-to-noise ratio (step 102). If either of these conditions is not met, the ability to make a marker determination is not present and, therefore, the counter 21a is decremented by 1.

If these conditions are met, the samples are then examined to assess the relative pulse width of the signal (step 103). Thus, if a relatively large number of samples (6 in the present case) are above the noise level, this indicates either an overly large pulse width not expected of a valid marker or too much noise during the marker window to make a valid marker decision. In either case, this is considered a serious failure, making detection of the presence of a marker highly unlikely, and both the time and frequency domain counters are returned to zero.

If the pulse width test is met, a phase test (104) is then carried out. This test looks to the position of the peak sample in relation to the peak sample two frames previous. In particular, the difference in the positions of these samples in their respective frames is required to be within one sample interval. This requirement is based, in part, on the fact that a valid marker should provide a signal at substantially the same point in each frame, while this would not be expected of the pulses from non-marker objects. The specific position error of one sample interval is based on sample and hold circuitry phase error and marker location in the field.

Furthermore, by comparing the peak samples in every other frame the influence of the earth's magnetic field on the analysis is removed. This is so because, depending upon the orientation of a marker in the zone 13 with respect to the applied field and the earth's field, the perturbations to the field caused by the marker and the resulting marker signal will not occur in the same position in the tag window in successive frames (i.e., alternate polarities of the drive). Moreover, for weak marker drive the signal may be absent from every other frame. Thus, the testing of alternate frames eliminates erroneous decisions which might occur due to the earth's magnetic field.

Failure of this phase test is also considered to establish that the presence of a marker is highly unlikely. Its failure is treated as was the failure of the pulse width test and both counters 21a and 21b are reset to zero.

If the phase test (104) is passed, a refined pulse width test (steps 105 and 106) must be carried out. If the samples above the 6dB threshold exceed three, this test fails. Moreover, if those samples above the 6dB threshold are not spaced within two sample intervals of each other, the test also fails. These failures, while indicative of a pulse width greater than expected from a valid marker, are not such as to make the likelihood of a marker entirely remote. The counter 21a is thus only decremented by 1 to indicate this condition.

If this second pulse width test is satisfied, there is a good likelihood that there is a marker present and the counter 21a is incremented by 2 to register this fact.

The final test (107 and 108) constitutes a further refined pulse width examination and if passed establishes a higher degree of confidence that a marker is present. If failed, however, this test does not detract from the earlier finding of the likelihood of marker presence. Passage of this test further increments the counter 21b by one, but its failure does not change the counter.

At the end of time domain routine 100, the frequency domain routine 200 is initiated. The frequency domain routine looks at the energy in the frequency bands FB1, FB2, and FB3 which are represented by the DC levels from integrators 68, 69, and 71. It then determines whether the slope of the frequency spectrum of the received signal is as expected of a valid marker and not as expected of non-marker objects.

As explained above, the filters 62, 63, and 64 have been designed so that the expected integrated outputs of the bands FB1, FB2, and FB3 for markers would result in equal or ascending DC values. Thus, the frequency domain routine checks for this increase in DC level.

More particularly, the first step in the frequency domain routine is to determine whether the 6dB threshold value for the DC level of the high band FB3 is less than the noise level. If yes, the test fails, the frequency counter 21b is decremented and the routine ends. If n, the routine continues to step 202 where the DC level of frequency band FB1 is checked to determine whether it exceeds a predetermined threshold value shown at 3 volts. This predetermined value is based on system contraints which are set to prevent the associated DC level for the band from exceeding this level for a valid marker under normal system operation. If the predetermined level is exceeded, the likelihood is that a valid marker is not present and the counter 21b is decremented and the routine therefore ends.

If the level is not exceeded, steps 203 and 204 are initiated, and the DC level of the band FB1 is compared to the DC level of the band FB2 and the DC level of the band FB2 is compared to the DC level of the band FB3. If either the band FB1 DC level is greater than the band FB2 DC level or the band FB2 DC level is greater than the band FB3 DC level, the test fails. The counter 21b is then decremented and the routine ends.

If the band FB1 DC level is less than the band FB2 DC level and the band FB2 DC level is less than the band FB3 DC level, the presence of a valid marker is likely and the counter 21b is incremented by 2 and the routine ends.

As discussed above, after the end of the frequency domain routine, the counters 21a and 21b are checked to determine whether their counts exceed the set preselected values indicative of the presence of a valid marker. In the illustrative system, the counters 21a and 21b are set so as to count up to a maximum of 12 and can count down to a minimum of zero. Furthermore, a count of 10 in each counter results in a decision of valid marker presence.

If the checking operation of the counters 21a and 21b does not result in the preselected counts in both counters, the computer 21 institutes the information gathering phase for the next frame of the applied field and the above procedure is repeated.

If the checking operation of the microcomputer does indicate arrival at the preselected counts, an alarm signal will be initiated provided it is not preempted by two further test routines of the computer.

One of these test routines is a spike detection routine to test the likelihood that the received signal might have resulted from electrical noise spikes and the other a fundamental frequency component test to determine whether the component of the receiver signal at the fundamental frequency has not exceeded a predetermined threshold associated with large metal objects in the zone 13.

Figure 6:
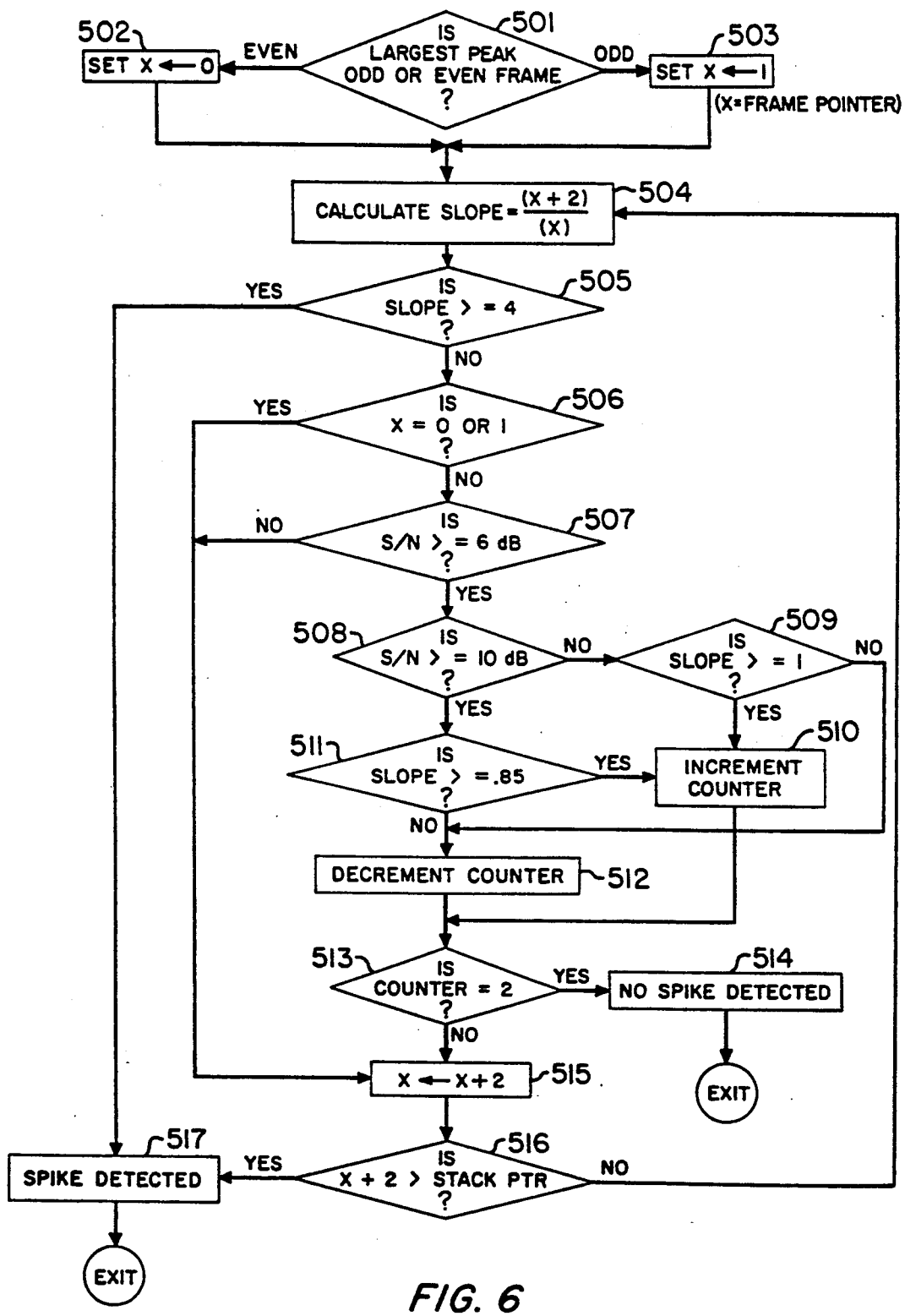
FIG. 6 shows the routine of the microcomputer of the system of FIG. 2A-2C for "spike" detection signal analysis.

The spike detection routine is shown in FIG. 6. As previously indicated, it is used to discriminate valid marker signals from electrical noise spikes arrising from power line transients from electrical discharge, switch closures, motor contactor noise, fluorescent and neon lights and so forth. Such noise sources generate transients in the form of electrical impulses or "spikes" which may not be discriminated by the time and frequency domain routines 100 and 200, because these spikes exhibit many characteristics similar to the type of magnetic marker the system 1 is set to respond to.

Specifically, noise spikes can exhibit the following features: (a) fundamentally, spikes are an impulse response, as is the signal from a valid marker, therefore, the time domain response from a spike may be quite similar to that of a valid marker; (b) spikes frequently have fast rise and fall times, and therefore produce a frequency spectrum similar to a valid marker; (c) depending on the source, spikes can be of an amplitude which will not be automatically rejected by the system; (d) because of the "echo" effect of the comb bandpass filter 58, a single spike can appear in multiple marker windows; and (e in general, many of the characteristics of noise spikes are similar enough to those of a valid marker that the filtering portions of the receiver 17, have little effect in attenuating them.

Figure 15:
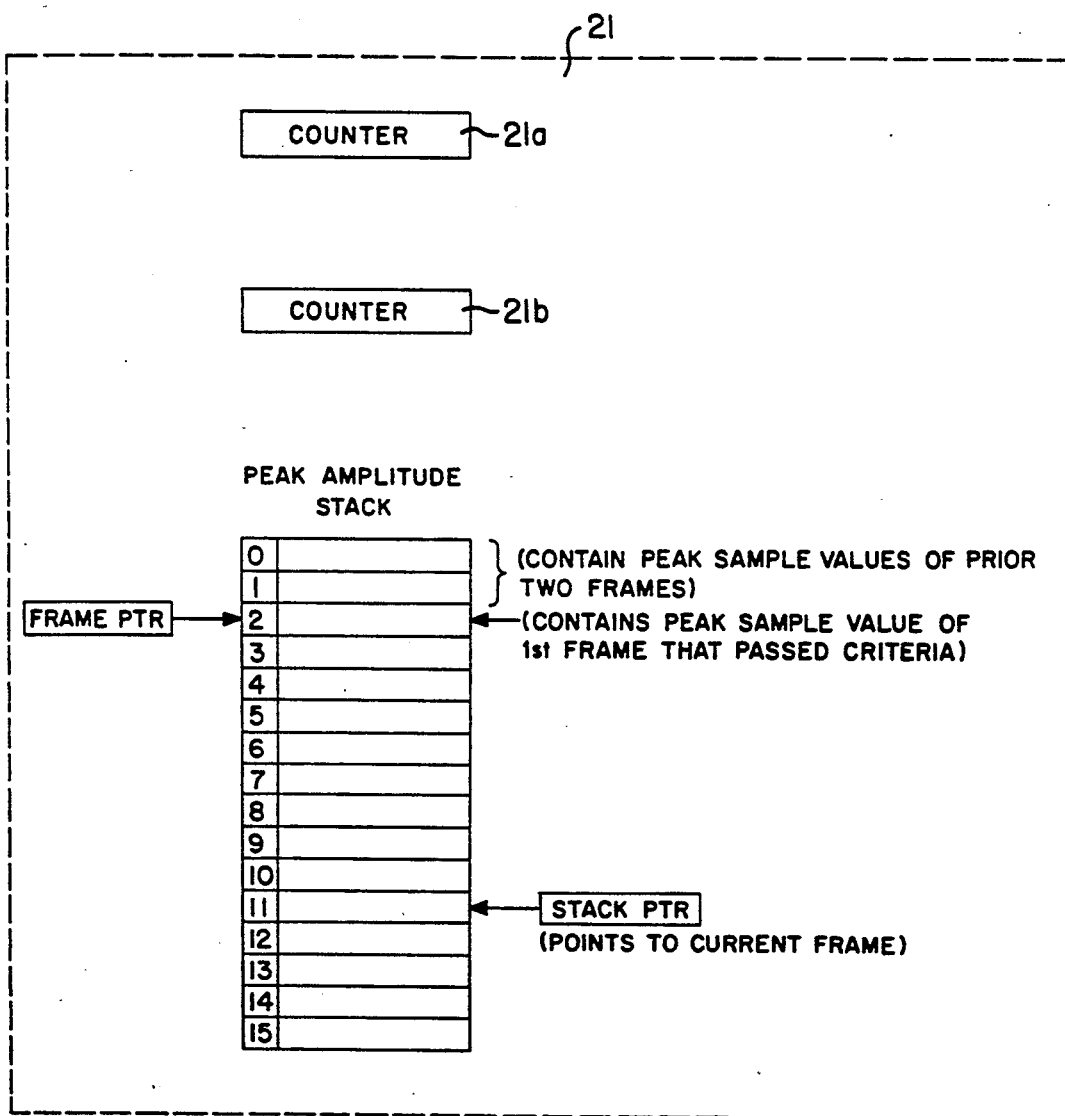
FIG. 15 shows counters and a peak amplitude stack of the microcomputer of the system of FIG. 2A-2C.

The spike detection routine depends upon the maintenance of a memory array called the peak amplitude stack (see FIG. 15). The stack locations contain peak values of the sample and hold circuit 74 during successive "tag window" intervals. On a continuing basis, location 1 is updated with the current frame peak value, the previous contents being pushed into location ∅. The first two stack locations thus contain a record of the marker or marker-like impulse.

Once time domain counter 21a reaches the preselected count indicative of a valid marker, the operation of the peak amplitude stack changes. Now, peak amplitudes of successive frames are placed in the stack from locations 2 through 15. When the frequency domain counter now also reaches its preselected value and computer 21 is about to address the alarm, the computer branches to the spike detection routine 500. It should be noted that the stack is not necessarily full at this point. The stack stops loading the instant the time and frequency domain counters are at their preselected counts.

In step 501 the microcomputer 21 examines the contents of the stack from location 2 to the location indicated by the stack pointer to determine the largest peak value. Once this is found, the microcomputer determines whether the peak occurred in an ODD or EVEN frame. If the maximum peak occurred in an odd frame, then the microcomputer advances to step 503 where an index called the Frame Pointer is set to stack position 1, if not, the microcomputer advances to step 502 where the Frame Pointer is set to stack position $\emptyset$. The reason for this action relates to the physics of magnetic system. Due to the influence of the earth's magnetic field on the system 1, two things can happen: (1) depending on the orientation of the system 1 antennas, the earth's field may alternately aid and oppose the system drive field as the drive field switches polarity, causing the marker signal in alternate windows to be of different amplitudes; (2) the earth's field acts as a DC bias on the material of the marker and depending on the marker orientation, the marker will "switch" and generate at different points in time in successive windows. In extreme cases a true marker signal may only appear in every other window.

A third reason for this ODD/EVEN approach in the spike detection routine is that a noise spike input wil be echoed by the Comb Bandpass Filter 58, every other frame.

Once this ODD or EVEN condition has been determined the microcomputer 21 advances to step 504 where only those appropriate stack frames are considered. For the present it will be asssumed that the EVEN case pertains, and the Stack Pointer stopped in frame 13.

In step 504 the rise time of the peak signal is determined. In most cases, the rise time of a spike will be faster then that of a marker. The Frame Pointer is now set to $\emptyset$. An initial slope determination is made by dividing the value in the frame 2 by the valve in frame $\emptyset$. The microcomputer then advances to step 505 where an evaluation of this slope is made. If this ratio or slope is equal to or greater than 4 then the signal is considered a spike and the microcomputer advances to step 517 where the spike routine is exited, otherwise the microcomputer proceeds to step 506.

In step 506 if X is $\emptyset$ or 1 then the microcomputer advances to step 515 where the Frame Pointer in incremented. A spike will frequently appear in one frame but not in the previous one, while a marker entering the system field will show a gradual buildup in amplitude from frame to frame. This test determines whether or not there was a signal in frame $\emptyset$ or 1 that did not quite qualify and pass the time domain criteria.

If the frame pointer in step 506 is not $\emptyset$ or 1 then the microcomputer advances to step 507 where a test is made to determine whether the peak in frame X is equal to or greater than 6dB above the noise level (twice as large). If not, the signal is too small to make a decision and the microcomputer proceeds to step 515 where the Frame Pointer is incremented by two. If the test passes the microcomputer advances to step 508 where a test is made to determine whether the peak in frame X is equal to or greater than 10dB above the noise level (three times as large).

If not, the microcomputer proceeds to step 509 where the slope is again tested. If the slope is equal to or greater than 1 then a "possible marker" counter is incremented in step 510. If the slope is not greater than 1 then the counter is decremented in step 512. If the S/N ratio is equal to or greater than 10dB, the microcomputer proceeds to step 511 where the slope is again tested. If the slope is equal to or greater than $\emptyset$.85 then the possible marker counter is incremented in step 510. If not, it is decremented in step 512 and proceeds to step 513.

In step 513 the possible marker counter is now checked and if the count is 2 then the microcomputer advances to step 514 where at least five successive marker signals have been received which have the proper rate of amplitude increase, and the routine is exited with the decision that the signals come from the valid marker. If the possible marker count is less than 2, then the microcomputer advances to step 515 where the Frame Pointer is incremented and proceeds to step 516.

In step 516 the new Frame Pointer location is compared to the Stack Pointer (in this case 13). If the Frame Pointer is beyond the Stack Pointer, then there are no more slopes to compare, it is assumed the peak values were spikes, the routine is exited and no alarm is generated (step 517). If the Frame Pointer is less than the Stack Pointer, then there is more information to process and a new slope is calculated in step 504.

Once the spike detection routine has been completed, if the decision was that a spike was present the counters 21a and 21b are reset to zero, no alarm is activated and the system 1 continues surveillance. If the decision was that a marker is present, the computer makes one final test before alarming. In this test the computer 21 compares the fundamental frequency component of the received signal read from multiplexer port PFo with its stored value and if the fundamental has changed beyond a predetermined threshold value, the decision is made that there is not a valid marker present. The computer 21 thus does not alarm the system and the counters 21a and 21b are returned to zero and surveillance continues. If the threshold is not exceeded the alarm activates indicating the presence of a marker in zone 13.

As indicated above, the microcomputer 21 upon initiating operation, makes a determination of the noise levels in the frequency bands FB1, FB2, and FB3 and uses these levels to establish an average noise level for the system 1 and for use in its decision routines. The microcomputer updates this noise level by periodically designating frames as noise update frames. During these frames, the microcomputer treats the DC levels, developed from the sub-channels as indicative of the noise level in the system and averages these levels to obtain an average noise value.

After a preselected number of noise update frames have been passed, the microcomputer averages the stored average noise values. This average is then treated by the microcomputer as the new ambient noise level and used in the subsequent decision making routines. The system 1 thus dynamically updates itself to accommodate for changing ambient conditions that might otherwise detract from the ability of the system to effect reliable marker detection.

Figure 7:
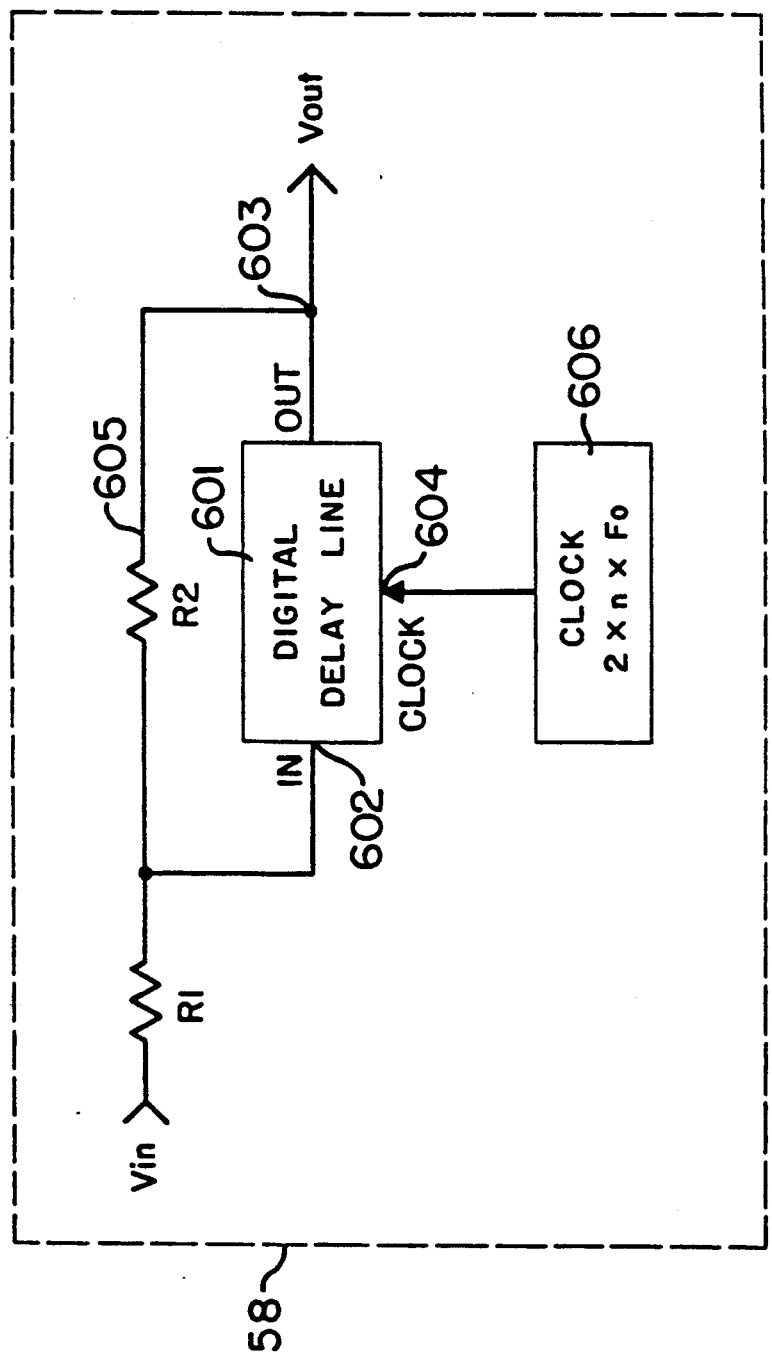
FIGS. 7 and 8 illustrate the comb bandpass filter of the detection portion of the system of FIG. 2A-2C.

In FIG. 7, a block diagram of the comb band pass filter 58 is illustrated. The filter comprises an integrated circuit, delay line 601, input and output ports 602 and 603 and a clock drive port 604. The output port of the delay line 603 is fed back to the input port 602 via feedback path 605 comprised of resistors R1 and R2.

A clock source 606 supplies clock signals to the port 604 of the delay line 601. The delay line 601 may typically be a Reticon R5107 integrated circuit. In such case, it contains 512 delay stages or monolithic capacitors and requires 2 clock cycles to shift from stage to stage.

The filter 58 in the subject configuration will pass harmonics of a fundamental frequency Fo if the clock rate is set at a value equal to the number of delay states times the frequency Fo times the cycles of the clock required to shift from one stage to the next. Thus for a 512 stage line requiring 2 cycles to shift and the frequency Fo of the system fundamental, a clock rate of 1024Fo is required, which is the signal applied to the filter 58 in FIG. 2 by level adjuster 76. In the filter configuration of FIG. 7, the Q of the filter is adjusted by adjusting the resistor $R_1$.

Figure 8:
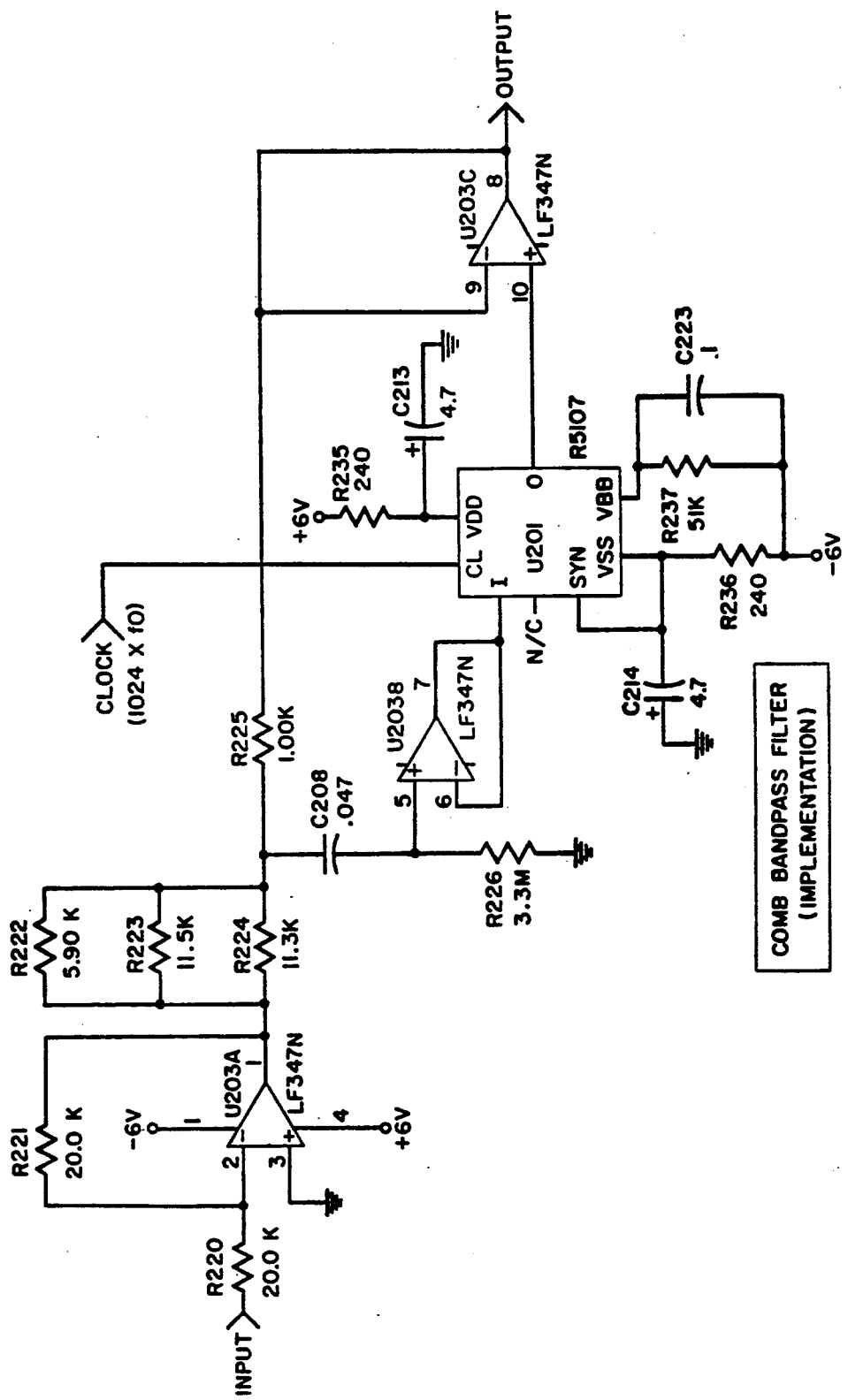

FIG. 8 illustrates an actual circuit configuration of the filter 58. In this case, the comb bandpass circuit is used to emphasize multiples of 73 Hz. R220, R221, and U203A form an inverting buffer amplifier, which is used to drive the comb bandpass circuit. The parallel combination of R222, R223, R224 correspond to R1 in FIG. 7, while R225 corresponds to R2. The three parallel resistors allow the Q of the circuit to be optimized, simply by clipping and removing the appropriate resistor(s). For most installations, all three parts will remain in the circuit.

C208, R226, and U203B allow the signal to be fed into the delay line IC U201. C208 serves as a DC block, with U203B as a unity gain, high input impedance, non-inverting buffer. The combination of high impedance and fairly low capacitance results in low phase delay in the DC block. R226 provides a DC path to ground for U203B.

As stated before, U201 is a delay line IC. The IC used in this implementation is the Reticon R5107. This IC contains 512 monolithic capacitors, and thus is clocked at a rate of 74.752 KHz (1024×73 Hz).

The remaining circuit component is U203C. As the Reticon R5107 has low output drive capability, a buffer must be used on its output. U203C is configured as a non-inverting buffer, and is able to supply enough output drive so that R225 is not too great a load.

In the discussion of system 1 above, it was pointed out that the channel B is provided with a notch filter which removes the power line frequency component from the received signal before the signal continues into the subsequent channels. In environments where the line frequency noise components are strong, the system can be further adapted to suppress not only the line frequency, but also all its harmonics. In particular, is shown in FIG. 8, a comb notch filter 58A having rejection bands at the line frequency and harmonics of the line frequency may be switched into the channel of the receiver preceding the comb bandpass filter 58 in order to remove the harmonics of the line frequency.

As indicated above, use of the notch comb filter 58A is particularly attractive in environments where the line interference is of significant magnitude. Where the magnitude is not significant, the filter may be switched out of the channel to avoid possible addition of noise to the system.

Figure 9:
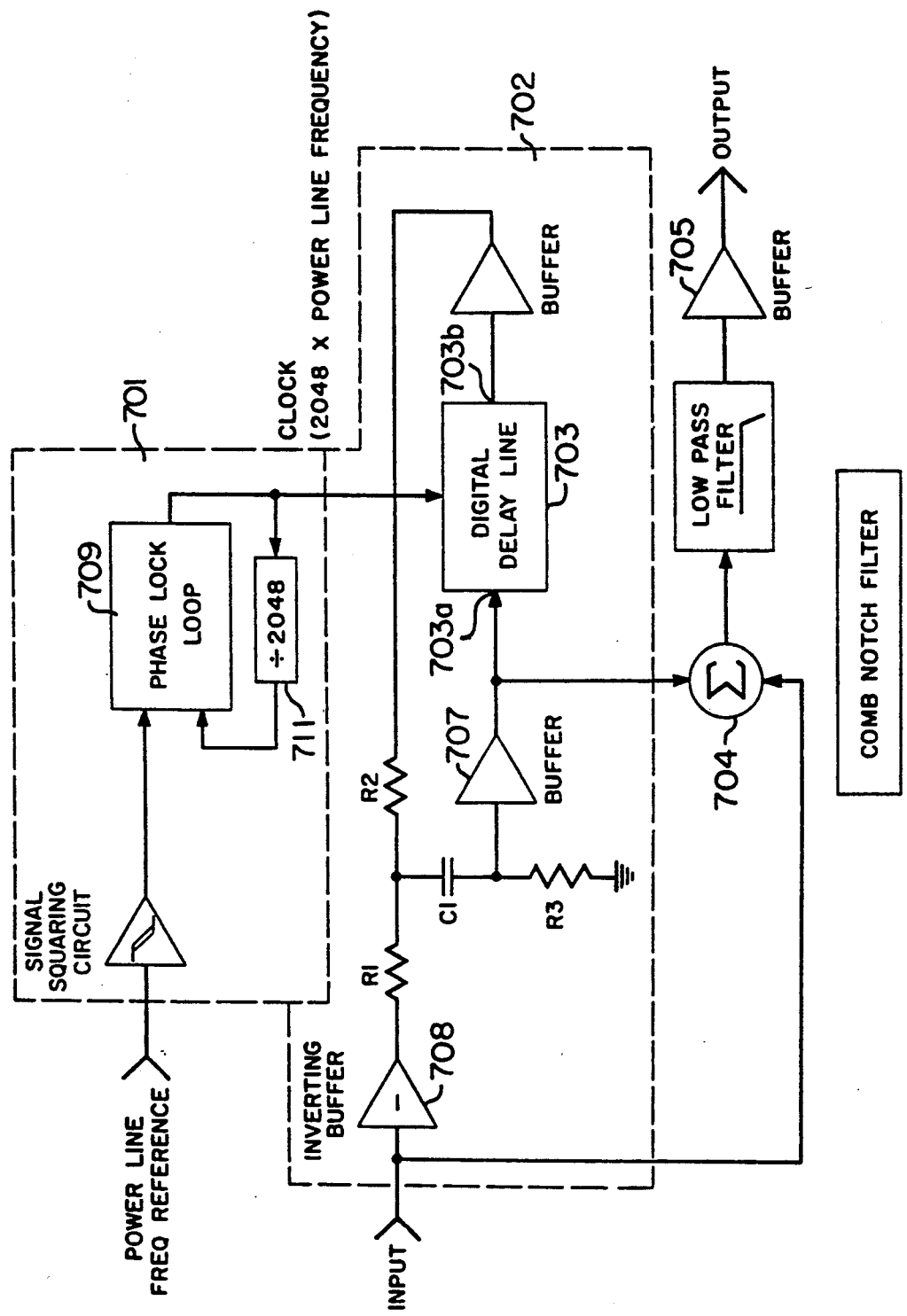

FIG. 9 shows a comb notch filter in accordance with the invention. The notch filter 701 comprises a comb bandpass filter 702 including a digital delay line 703. Signal is fed from the output port 703b of the delay line back to its input port 703a via a buffer 707, resistor $R_2$, capacitor $C_1$, and resistor $R_3$. The input signal is coupled to the input port 703a through an inverting buffer 708, resistor $R_1$, capacitor $C_1$ and resistor $R_3$.

The input signal and input to port 703a are coupled to a summing circuit 704. Because the latter inputs are out of phase due to the inverting buffer 708, the power line frequency and its harmonics in the input are subtracted and effectively removed from the input. A comb notch characteristic thereby results.

The clock signal for the delay line 703 is derived from a power line reference frequency which is passed through a squaring circuit 707, a phase lock loop 708 which operates at 2n, where n is the number of delay line stages, times the power line frequency. A divider 611 performs a 2n division of the phase lock loop output to provide a proper reference for the loop.

Figure 9A:
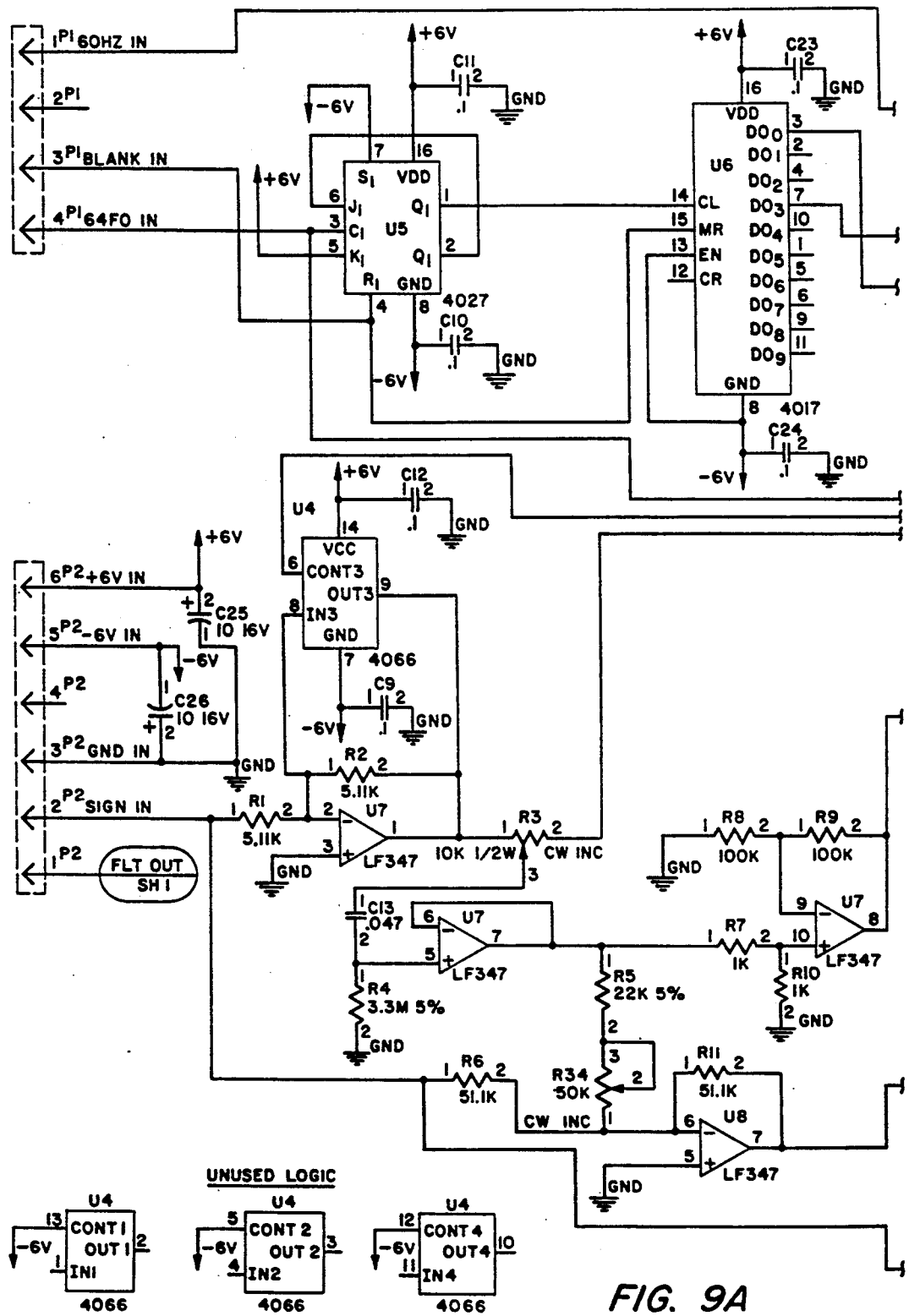
Figure 9B:
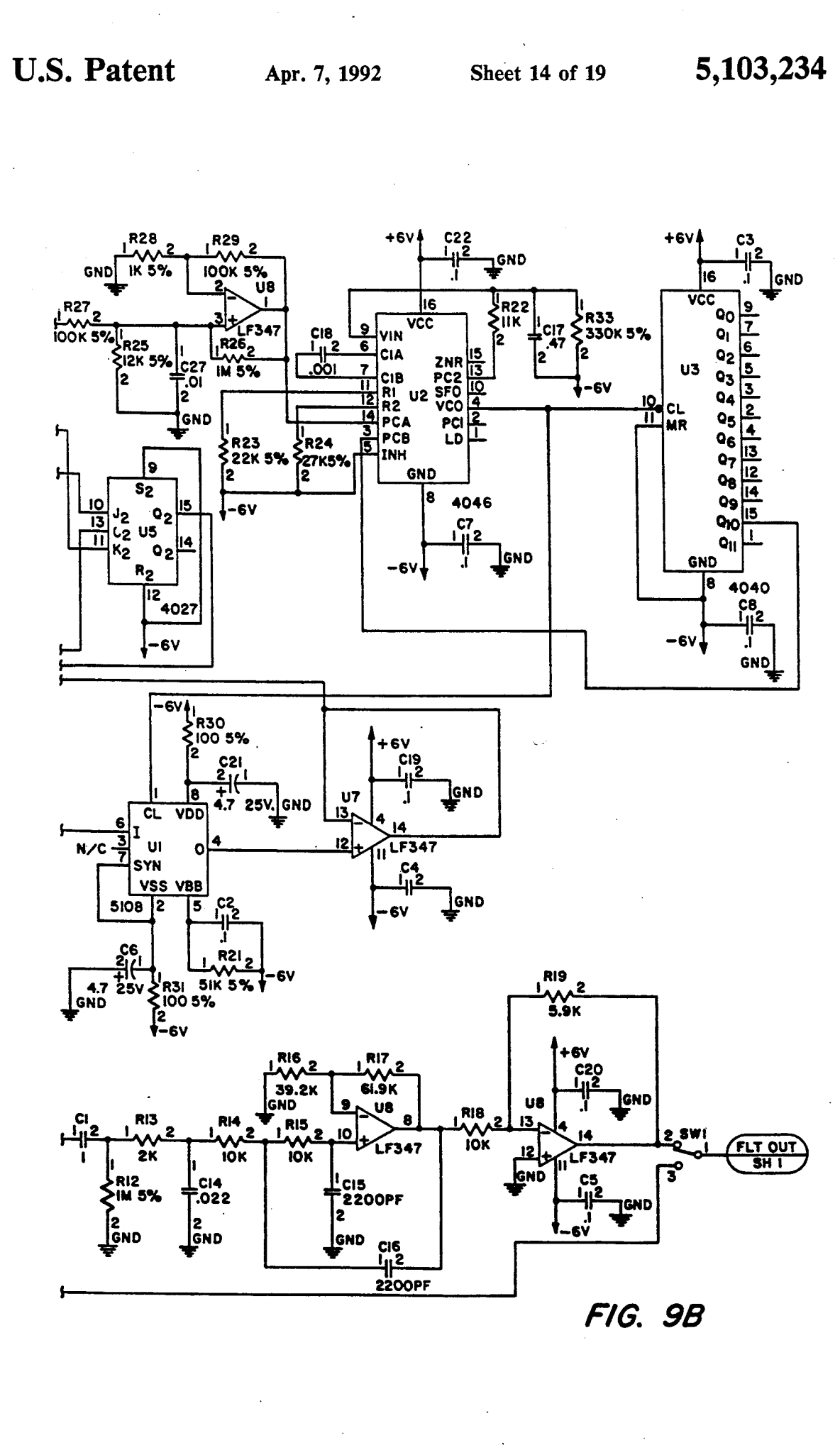

FIG. 9A-9B show an actual circuit embodiment of notch comb filter 601 for the system 1. The signal squaring circuit is made up of R25-29, C27, and U8A. R25 and R27 function as a voltage divider to insure the input power line sine wave amplitude does not exceed the safe input level of U8A. R25, along with R27, also low pass filter the input signal. R28 and R29 serve as gain setting resistors, which insure that the circuit output is a rectangular pulse train. This high gain causes the pulse train to move quickly between its positive and negative levels. R26 supplies hysteresis to the circuit, which also serves to shorten this transition time. This is necessary as the phase locked loop circuit which follows requires short transition times.

The phase locked loop is composed of U2, U3, C17, C18, R22, and R33. The phase locked loop is used as a frequency multiplexer to supply the necessary clock signal to the delay line IC U1. The phase locked loop voltage controlled oscillator (VCO) operates at a frequency that is 2048 times the power line frequency. A 2048 divider is in the loop, so the VCO can be phased locked to the power line signal.

As the shield spike is an unwanted signal that would add noise to the output of the comb notch filter, U5 an U6 generate the blanker control signal from SSB1 and 64FO This signal operates electronic switch U4C so that the shield spike is not passed by U7A. Besides serving as blanker, U7A doubles as an inverting buffer at the input of the comb band pass part of the comb notch circuit.

The comb bandpass section is composed of U1, U7B U7C, U7D, R3, R4, R7-10, R21, and C13. The operation or this portion of the circuit is identical to that described earlier for the comb bandpass filter, with the exceptions that the delay line IC is the Retican R5108 and that the clock frequency is 2048 times the filter fundamental frequency.

The summing circuit is composed of R5, R6, and U8B. R5 and R6 set the proportion in which the comb notched signal and the input signal are to be added together. They are not added in equal proportion because of the blanking which was done on the comb notched signal. The signals subtract because the comb notched signal was inverted by U7A.

After the summing circuit, a low pass filter is employed to suppress any switching noise generated by U1. The filter cutoff frequency is 8 KHz, so that all of the marker harmonics of interest are passed. After the filter, an amplifier is employed to set the remaining signal levels to the same amplitude they would have if the filter was not employed.

In accordance with a further a aspect of the invention, the transmit and receive antenna arrays of the system 1 are designed to provide reduction in the usual nulls found in the field in the zone 13.

Figure 10:
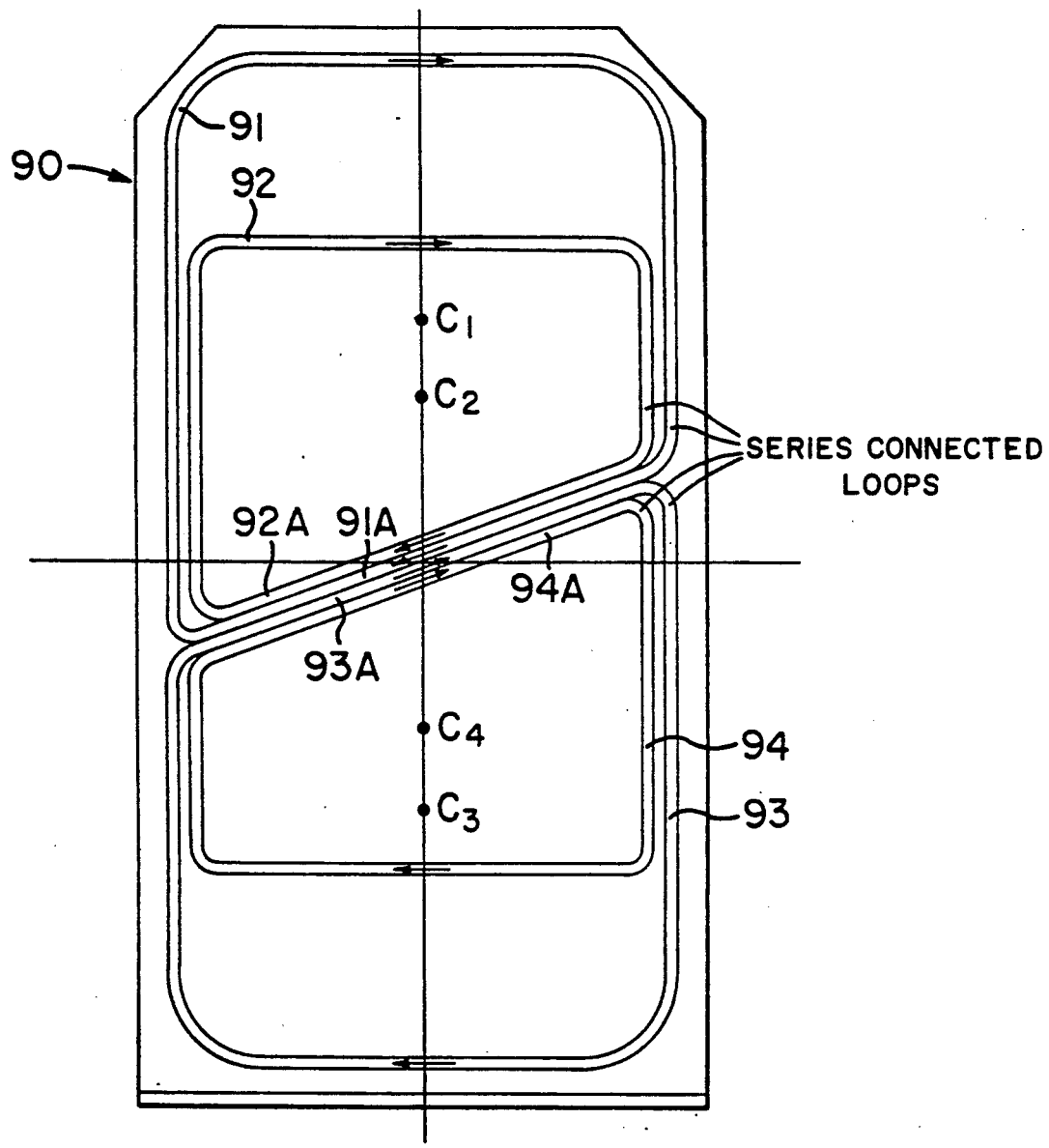
FIGS. 10 and 11 illustrate a receiver and transmitter antenna array, respectively, useable with the system of FIG. 2A-2C.

FIG. 10 shows the receiver antenna array 90 adapted in this manner. The antenna array comprises first and second upper loops 91 and 92 which are in nested relationship and first and second lower loops 93 and 94 which are also in nested relationship. The nesting is such that the center $C_2$ of loop 92 is offset from the center $C_1$ of loop 91 and the center $C_4$ of the, loop 94 is offset from the center $C_3$ of the loop 93. The upper loop 91 is further arranged in figure eight relationship with the lower loop 93 and the upper loop 92 is arranged in figure eight relationship with lower loop 94.

The coplanar loops 91-94 are all wound in a clockwise sense as shown by the arrows and are all connected electrically in series. Furthermore, the loops are phased so that the upper loops 91 and 92 are of the same first phase and the loops 93 and 94 are of the same second phase, the first and second phases being opposite to each other.

In the preferred form of the array 90, the loop sections at the interface region of the figure eight configurations, i.e., 91A, 92A, 93A, and 94A, are at a slant relative to the horizontal axis. A typical value for the slant angle is 20°. In the preferred case shown, the outer loops 91 and 93 are also mirror images of each other as are the inner loops 92 and 94.

Figure 12:
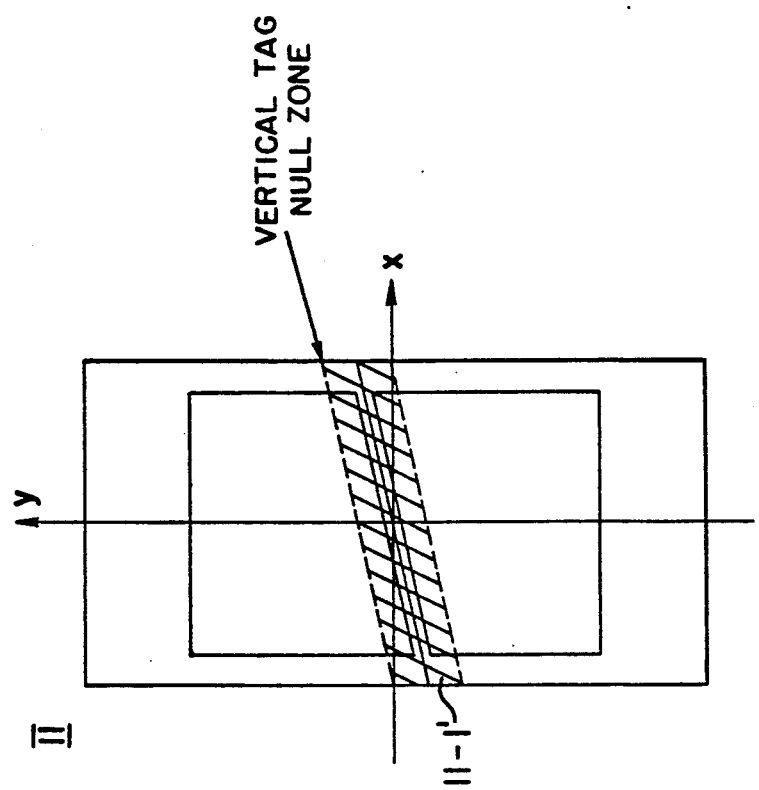
FIG. 12 shows the null zones for a typical antenna array and for the antenna array of FIG. 10.
Figure 12:
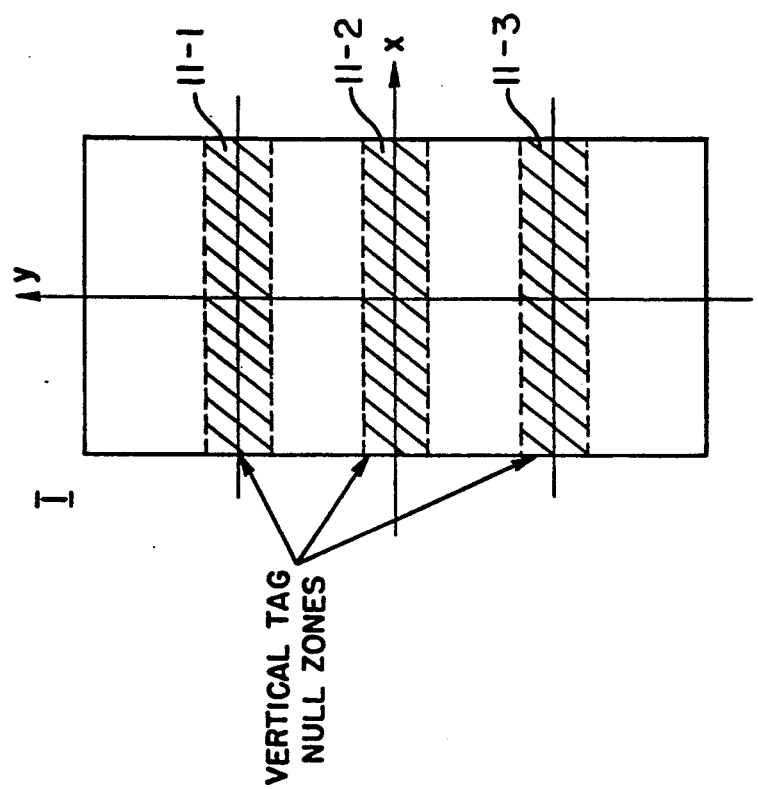

FIG. 12 shows pictorally in I the null zones of a receiver antenna array having a figure eight configuration. As can be seen, the antenna exhibits nulls along the vertical axis of the array in three distinct bands 11-1, 11-2, and 11-3. FIG. 12 also shows in II the null zones of the improved antenna array 90 of the invention.

As can be seen, the null zones have been reduced to only one zone 11-1, which is at an angle or slant relative to the horizontal. This null zone, however, because of its slant will now advantageously couple with vertically oriented markers along the x-axis so that its effect is significantly minimized.

Figure 11:
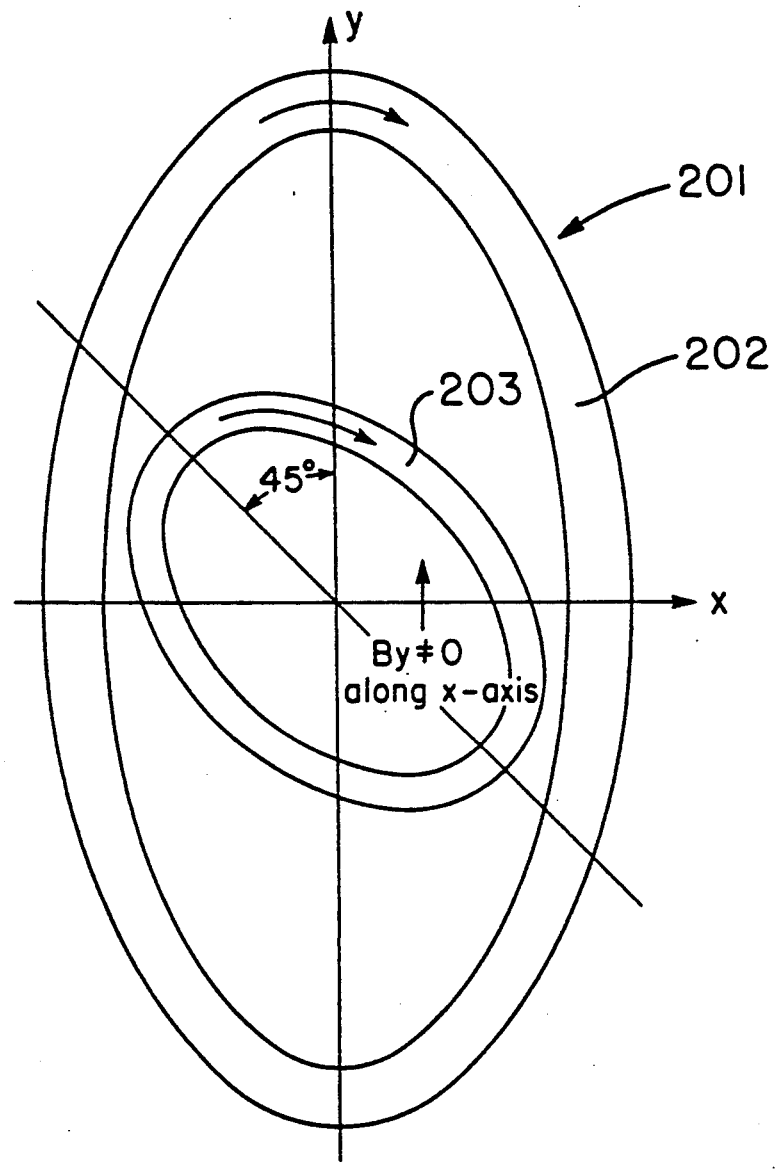

FIG. 11 shows an improved transmitter antenna array 201 for the system 1 and particularly adapted for use with the receiver antenna of FIG. 10. The antenna array 201 comprises a first single loop 202 in which is nested a second coplanar loop 203. The main axis of the second loop 203 is rotated relative to the main axis (y-axis) of the loop 202. In this case, the loops are both wound clockwise and are phased the same. As shown in FIG. 11, both loops 202 and 203 are concentric.

The presence of the inner loop 203 of the antenna array 201 results in a field in the y direction along the x-axis of the loop 202 which would not be the case if the loop 203 were absent. In this regard, as above-mentioned, the receiver antenna of FIG. 10 is now able to couple with fields along the horizontal or x-axis so that antennas in the system 1 of the invention now enable detection of markers passing through the zone 13 along the horizontal direction.

Figure 13:
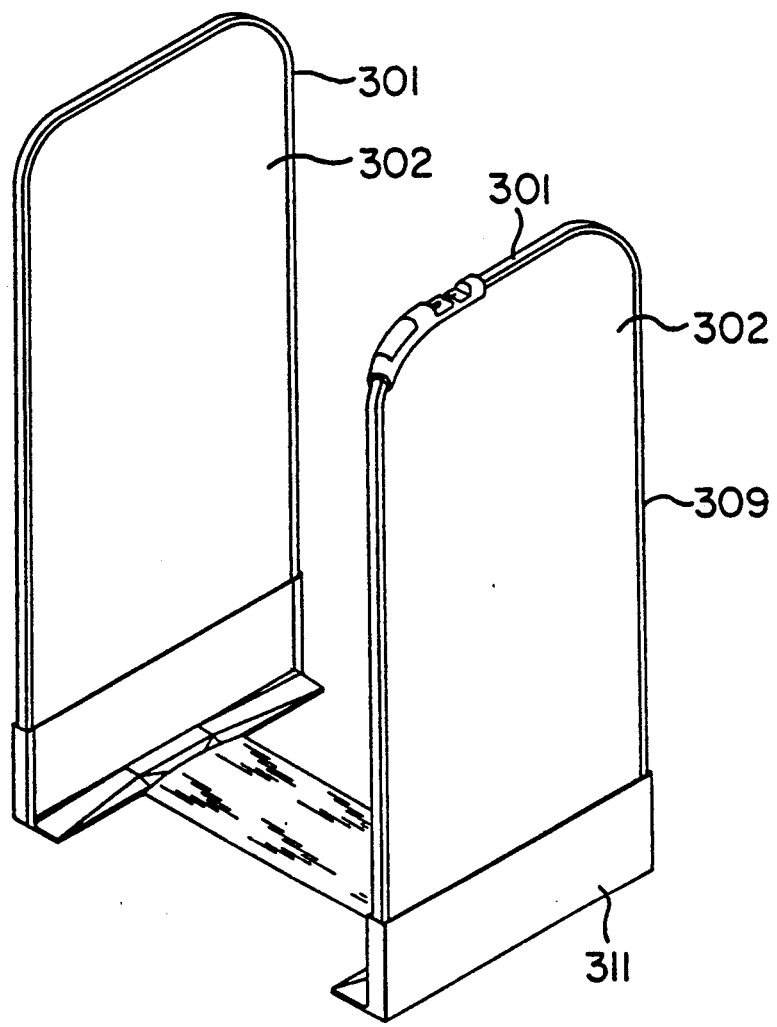
FIG. 13 illustrates a pedestal arrangement useable for housing the antenna arrays of FIGS. 10 and 11.
Figure 14:
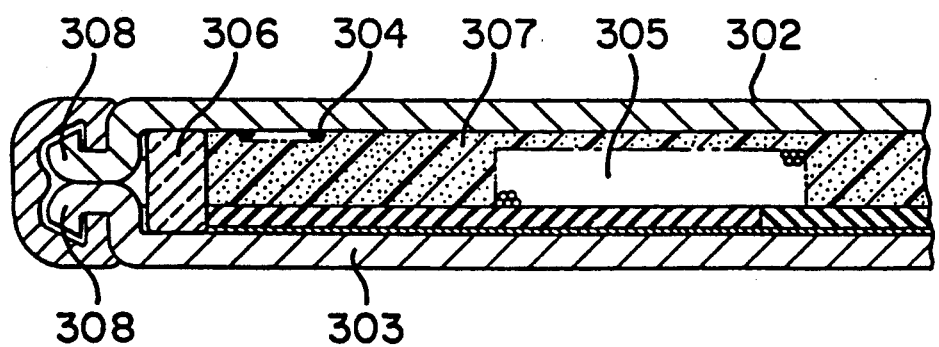
FIG. 14 shows a cross-section through one of the pedestals of FIG. 13.

In a further, aspect of the system 1, pedestals of unique construction are utilized to house the transmitter and antenna arrays of the system 1. FIG. 13 illustrates the pedestal construction and FIG. 14 shows a cross-section through the pedestals.

As shown, the pedestals 301 comprises facing walls or shells 302 and 303 made preferably of plastic and joined to form a clamshell type cavity for housing transmitter and receiver antenna arrays depicted by coils 304 and 305. The arrays are mounted between stiffening bars 306 which are situated at the lateral ends of the cavity.

Filling cavity void space and surrounding the coils 304 and 305 is .a rigid, high density foam 307, such as a urethane. The high density, rigid foam 307 immobilizes the antenna coils and imparts considerable strength and stiffness to the completed pedestal.

The edges of the shells 302 and 303 are formed into hooks 308 which are adapted to receive an extruded edge strip or bumper 309. A support base 311 is further provided to fasten the pedestal to the floor.

The pedestals are formed by first mounting the internal components including array coils 304 and 305 in one of the shells 302. The components are then tacked in place with an adhesive such as a hot melt. Both shells 302 and 303 are then filled with a predetermined amount of chemically reactive foam (such as polyurethane, consisting of various combinations of polyolesocyanate based foams) of desired density. The shells are then closed and placed into a platen press for a short term cure (5 to 10 minutes), resulting in a rigid, compact structure. The remaining portions of the pedestals are then added to complete the pedestal.

In all cases, it is understood that above-identified arrangements are merely illustrative of the many possible specific imbodiments which represent applications of the present invention. Numerous and varied other arrangements can readily be devised in accordance with the principles of the invention without departing of the spirit and scope of the invention. Thus, for example, the system 2 can be provided with a further multiplexer 78 for gathering diagnostic information from the components of the receiver such as, shown in FIG. 2A-2C. This diagnostic information can then be read by computer 21 to diagnose problems with the receiver components.

What is claimed is:

1. An antenna for use in an article surveillance system comprising: first and second loops arranged in a given plane, said second loop being situated entirely within said first loop so as to be in nested relationship with said first loop, said first loop having a first section and second and third sections extending from opposing ends of said first section of said first loop, said second loop having a first section and second and third sections extending from opposing ends of said first section of said second loop, said first, second and third sections of said second loop facing the first second and third sections, respectively, of said first loop, and the spacing of the first section of said second loop from the first section of said first loop being greater than the spacing of said second and third sections of said second loop from the second and third sections, respectively, of said first loop; third and fourth lops arranged in said given plane, said fourth loop being situated entirely within said third loop so as to be in nested relationship with said third loop, said third loop having a first section and second and third sections extending from opposing ends of the first section of said third loop, said fourth loop having a first section and second and third sections extending from opposing ends of said first section of said fourth loop, said first, second and third sections of said fourth loop facing said first, second and third sections, respectively, of said third loop, and the spacing of the first section of said fourth loop from the first section of said third loop being greater than the spacing of said second and third sections of said fourth loop from the second and third sections respectively, of said third loop; said first and second loops being arranged adjacent to said third and fourth loops such that the first section of said first loop and the first section of said third loop are at opposing ends of said adjacent arrangement of loops, said first through fourth loops being connected electrically such that said first and second loops have the same first phase and the third and fourth loops have the same second phase opposite said first phase, and said first and second loops and said third and fourth loops having relative sizes and arrangement such that, in combination with said nested relationship and phasing, cause said array to exhibit substantially a single null zone along a given direction in said plane.

2. An antenna array in accordance with claim 1 wherein: said first through fourth loops are electrically connected in series.

3. An antenna array in accordance with claim 1 wherein: each of the first, second, third and fourth loops has a fourth loop section connecting further opposing ends of the second and third loop sections of its respective loop, said fourth loop sections of said first, second, third and fourth loops being adjacently arranged and slanted at an angle with respect to a further given direction in said plane.

4. An antenna array in accordance with claim 3 wherein: the angles at which said adjacent fourth loop sections of sad first, second, third and fourth loops are slanted with respect to the further given direction are the same.

5. An antenna array in accordance with claim 1 wherein: the center of said first loop is off-set from the center of said second loop; and the center of said third loop is off-set from the center of said fourth loop.

6. An antenna array in accordance with claim 1 wherein: said first and second loops are mirror images of said third and fourth loops.

7. A transmitter antenna array comprising: a first loop situated in a given plane, said first loop having a maximum diameter which is greater than any other diameter of said first loop and which is along a first direction in said given plane, a second loop situated in said given plane, said second loop having a maximum diameter which is greater than the value of any other diameter of said second loop and which is along a second direction in said given plane, said second loop being concentric with and situated entirely within said first loop so as to be in nested relationship with said first loop and said second loop being rotated relative to said first loop so that said maximum diameter of said second loop in said second direction is rotated relative to said maximum diameter of said first loop in said first direction.

8. An antenna in accordance with claim 7 wherein: the angle between the first and second directions of said first and second loops is approximately 45 degrees.

* * * * *